United States Patent
Srinivasan

(10) Patent No.: US 9,617,904 B2
(45) Date of Patent: Apr. 11, 2017

(54) SELF COOLED ENGINE

(71) Applicant: Anisun EcoTech P Ltd, Riverside, RI (US)

(72) Inventor: Sundararajan Srinivasan, Riverside, RI (US)

(73) Assignee: Anisun EcoTech Pvt Ltd., Chennai (IN)

(*) Notice: Subject to any disclaimer, the term of this patent is extended or adjusted under 35 U.S.C. 154(b) by 35 days.

(21) Appl. No.: 14/493,093

(22) Filed: Sep. 22, 2014

(65) Prior Publication Data

US 2015/0083074 A1    Mar. 26, 2015

Related U.S. Application Data

(60) Provisional application No. 61/882,529, filed on Sep. 25, 2013.

(51) Int. Cl.
*F01L 9/02* (2006.01)
*F01P 1/02* (2006.01)
(Continued)

(52) U.S. Cl.
CPC ............... *F01P 1/02* (2013.01); *F01L 1/047* (2013.01); *F01L 1/462* (2013.01); *F01L 7/028* (2013.01);
(Continued)

(58) Field of Classification Search
CPC .................... F01L 7/06; F01L 7/028
(Continued)

(56) References Cited

U.S. PATENT DOCUMENTS

| | | |
|---|---|---|
| 4,034,723 A | 7/1977 | Hamparian |
| 4,162,661 A | 7/1979 | Nakanishi et al. |
| | (Continued) | |

FOREIGN PATENT DOCUMENTS

| | | |
|---|---|---|
| DE | 19619782 A1 | 11/1996 |
| GB | 1246890 A | 9/1971 |
| JP | 2007/512459 A | 5/2007 |

OTHER PUBLICATIONS

International Search Report dated Jan. 12, 2015 for corresponding International Application No. PCT/US2014/056780.

*Primary Examiner* — Marguerite McMahon
*Assistant Examiner* — James Kim
(74) *Attorney, Agent, or Firm* — Evergreen Valley Law Group; Kanika Radhakrishnan

(57) ABSTRACT

Self-cooled engine including a cylinder, a cylinder head and a turbo-piston which freely reciprocates inside the cylinder. The cylinder head has a valve that achieves circumferential suction of air-fuel mixture into the cylinder. The valve mechanism is closed and opened by cylindrical cam by means of cam shaft. Circumferential suction of air-fuel mixture enables the cylinder to cool itself and to burn the fuel at the energy center effectively. The force of incoming stream of air-fuel mixture rotates the impeller on the piston which acts as a fan to cool the cylinder walls. The impeller blades deflect the flame from reaching the cylinder walls and acts as a thermal barrier between the energy center and cylinder walls. The high intensity compression swirl (HICS) created at the end of the compression stroke to ensure that the fuel combustion is efficient and instantaneous release of maximum energy.

7 Claims, 25 Drawing Sheets

(51) Int. Cl.
  F01L 1/047   (2006.01)
  F01L 1/46    (2006.01)
  F01L 7/10    (2006.01)
  F02B 23/08   (2006.01)
  F02B 31/00   (2006.01)
  F01L 7/02    (2006.01)
  F01L 7/04    (2006.01)
  F01L 7/06    (2006.01)
  F02B 19/02   (2006.01)
  F02B 19/10   (2006.01)

(52) U.S. Cl.
  CPC  F01L 7/04 (2013.01); F01L 7/06 (2013.01); F01L 7/10 (2013.01); F02B 23/08 (2013.01); F02B 31/00 (2013.01); F02B 19/02 (2013.01); F02B 19/108 (2013.01); Y02T 10/125 (2013.01); Y02T 10/146 (2013.01)

(58) Field of Classification Search
  USPC ......... 123/90.16, 90.17, 190.4, 190.14, 294
  See application file for complete search history.

(56) References Cited

U.S. PATENT DOCUMENTS

| | | | |
|---|---|---|---|
| 4,182,279 A | 1/1980 | Sato et al. | |
| 4,291,655 A | 9/1981 | Yamakawa | |
| 4,425,881 A * | 1/1984 | Lyndhurst | F02B 29/0475 123/184.34 |
| 4,495,907 A | 1/1985 | Kamo | |
| 4,798,183 A | 1/1989 | Hataura et al. | |
| 4,850,317 A | 7/1989 | Katsumoto et al. | |
| 4,909,210 A | 3/1990 | Shimada et al. | |
| 5,065,715 A | 11/1991 | Evans | |
| 5,103,784 A | 4/1992 | Evans | |
| 5,351,665 A | 10/1994 | Kapus et al. | |
| 5,452,702 A | 9/1995 | Ebihara et al. | |
| 5,632,145 A | 5/1997 | Hunt | |
| 5,727,519 A | 3/1998 | Kawamura | |
| 5,943,993 A | 8/1999 | Carstensen et al. | |
| RE36,500 E | 1/2000 | Ando et al. | |
| 6,092,501 A | 7/2000 | Matayoshi et al. | |
| 6,237,579 B1 | 5/2001 | Singh | |
| RE37,714 E | 5/2002 | Ueda et al. | |
| 6,595,177 B1 * | 7/2003 | Kramar | F01L 7/02 123/190.2 |
| 7,383,831 B2 | 6/2008 | Nabetani et al. | |
| 7,669,559 B2 | 3/2010 | Aoyama et al. | |
| 7,685,986 B2 * | 3/2010 | Agapiades | F01L 7/028 123/190.14 |
| RE41,344 E | 5/2010 | Funaki et al. | |
| 7,721,704 B2 | 5/2010 | Lehmann | |
| 8,091,537 B2 | 1/2012 | Manning et al. | |
| 8,622,044 B2 | 1/2014 | Magro et al. | |
| 8,662,053 B2 | 3/2014 | LaPointe et al. | |
| 8,770,168 B2 | 7/2014 | Cornwell et al. | |
| 2005/0081508 A1 | 4/2005 | Edelman et al. | |
| 2008/0041325 A1 * | 2/2008 | Agapiades | F01L 7/028 123/90.22 |
| 2009/0133660 A1 * | 5/2009 | Mercz | F16K 11/0836 123/190.14 |
| 2010/0251692 A1 | 10/2010 | Kinde, Sr. | |
| 2012/0073536 A1 * | 3/2012 | Crosset | F01L 7/10 123/193.5 |
| 2013/0081584 A1 | 4/2013 | Kisaichi et al. | |
| 2014/0165960 A1 | 6/2014 | Han et al. | |

* cited by examiner

SELF COOLED ENGINE

CROSS-REFERENCE TO RELATED APPLICATION

This application claims priority to U.S. Provisional Patent Application No. 61/882,529, filed Sep. 25, 2013, which is incorporated herein by reference.

FIELD

The subject technology relates generally to the internal combustion engine that can be used for transportation, power generation and industrial appliances and, more particularly, to generate energy without the need for a complicated cooling system.

BACKGROUND

Combustion efficiency of an internal combustion engine mainly depends quality of air-fuel mixture. Generating Swirl at the a) inlet manifold, b) cylinder head, c) top of the piston plays vital role in achieving the good thermodynamic efficiency. Swirl is generated in different forms like vortex, tumble flow, squish and turbulence. In spark ignition (SI) engines, swirling of the air-fuel mixture is achieved during suction stroke called induction swirl which is generated in the induction manifold or specially formed contours over the piston.

In compression ignition (CI) engines, swirling is achieved at the end of the compression stroke which is called as compression swirl generated in the cylinder head. Spherical swirl chambers are formed in the cylinder head where diesel fuel is injected. During the compression stroke, the compressed air is forced into the spherical swirl chamber causing the injected fuel to mix thoroughly to achieve effective combustion. The swirl caused by these techniques are local to the small region of the cylinder or cylinder head which accomplish little improvement in fuel efficiency while producing harmful emissions.

The heat loss to the cooling medium is more than useful work on the piston. More than a third of the total heat of the consumed fuel is lost to the cooling medium and cooling system accessories. The prior art efforts to prevent heat loss to the cooling medium have not yielded favorable results.

IC engines suffer from a major pitfall that more than a third of heat generated is transferred to the cylinder walls. During combustion process flame propagates abruptly in all directions and conducts huge amount of heat to the cooling medium through the cylinder walls. Low heat rejection (LHR) engines were developed during 1980s in which combustion chambers are coated with zirconium based ceramics to prevent heat loss to the surroundings up to 7%. In gasoline engines, use of ceramic materials results in overheating of the intake air, which leads to undesirable engine knock at high load operations. Because of these reasons, the research on LHR engines has been discontinued.

SUMMARY

In the context of aforementioned difficulties the present subject technology has been made to provide a means for eliminating heat loss through the cylinder walls of an internal combustion Engine (100). It also achieves efficient combustion of fuel so that emission due to incomplete combustion is negligible.

The subject technology includes a Sunflower valve as an inlet valve operated by a cylindrical cam to permit circumferential suction of air-fuel mixture into the cylinder, which acts as thermal barrier between cylinder walls and energy center. Thus, substantial heat loss to the cooling medium is prevented.

During the suction stroke, the air-fuel mixture swirls and sweeps away the heat from the cylinder walls. Also the cylinder with a turbo-piston assembly ensures perfect air-fuel mixture for ideal combustion. During the compression stroke, impeller blades aggravate the swirling motion to generate high intensity compression swirl (HICS) at the center of the cylinder. The high intensity compression swirl ensures every fuel molecule is subjected to multiple collisions for the effective combustion process to enhance fuel efficiency.

High intensity compression swirl (HICS) can be a direct swirl or counter swirl depending on the type of fuel used.

One embodiment is directed to an engine including a cylinder head body comprising a Sunflower mechanism, an exhaust valve mechanism; and a reciprocating turbo-piston assembly movable through a stroke in the cylinder.

The cylinder head body comprises: an inlet manifold and an exhaust manifold are disposed on the cylindrical surface of the cylinder head body; a valve lock housing on the cylindrical surface of the cylinder head body to accommodate a Sunflower valve upper guide lock, a Sunflower valve lock, a Sunflower valve lower guide lock, Sunflower valve assembly cover and a cylindrical cam follower; a bracket provides bearing support for the camshaft and pushrod; an annular protrusion disposed on the outer cylindrical surface of the exhaust chamber to stop the Sunflower valve assembly movement along the cylinder axis; a recess below the said annular protrusion to receive Sunflower assembly circlip disposed on the outer cylindrical surface of the exhaust chamber to stop the Sunflower valve assembly movement along the cylinder axis; and threaded holes on the top surface of the cylinder head body to receive an injector and an igniter plug.

The Sunflower valve mechanism or inlet valve mechanism disposed adjacent the inlet manifold comprises: a Sunflower valve upper guide having plurality of radial channels disposed concentrically with engine cylinder axis for guiding air-fuel mixture flow during the suction stroke, wherein said Sunflower valve upper guide is secured to cylinder head body to prevent the rotation about cylinder axis; a Sunflower valve lower guide has plurality of helical shaped, radial channels in line with said Sunflower valve upper guide disposed concentrically with the engine cylinder axis for guiding the air-fuel mixture to the cylinder to generate circumferential swirl, wherein said Sunflower valve lower guide is secured to cylinder head body to prevent the rotation about cylinder axis; a Sunflower valve has plurality of radial channels disposed concentrically with engine cylinder axis for permitting air-fuel mixture flow during the suction stroke, wherein said Sunflower valve is secured to cylindrical cam follower, said cylindrical cam follower to provide angular movement to said Sunflower valve; the cylindrical cam follower disposed on the top surface of the Sunflower valve lock to follow the cylindrical cam profile to impart angular movement to the Sunflower valve; an angular slot is formed on the Sunflower valve lock housing of the cylinder head body to guide the cylindrical cam follower in an angular path; and a helical spring disposed on Sunflower valve spring seats to keep the Sunflower valve in closed position.

The exhaust valve mechanism comprising exhaust valve cam, push rod, adjustable rocker arm and exhaust valve to expel burnt gases out of the cylinder.

The camshaft comprising an exhaust valve cam and a cylindrical cam are disposed on the cylindrical surface of the camshaft; an exhaust valve cam for imparting reciprocating motion to the push rod; and a cylindrical cam for imparting angular motion to the cylindrical cam follower and to the Sunflower valve.

The turbo-piston assembly, comprising an impeller rotatably disposed on top surface of the piston, said impeller rotated by the force of intake air-fuel mixture about cylinder axis, wherein the impeller is secured to said piston to prevent movement along the cylinder axis; and a connecting rod to convert reciprocating motion to rotary motion.

In the embodiment Sunflower mechanism whereas Sunflower valve is rotatable about cylinder axis between Sunflower valve upper guide and Sunflower valve lower guide, and said Sunflower valve uncover the radial channels of Sunflower valve upper guide and Sunflower valve lower guide to permit the air-fuel mixture flow into the cylinder during suction stroke; and the Sunflower valve mechanism, wherein the radial, helical channels of a Sunflower valve lower guide direct the air-fuel mixture flow into the cylinder circumferentially to generate circumferential swirl within the cylinder; the circumferential swirl generated by the said Sunflower mechanism, cools the walls of engine cylinder; the circumferential swirl generated by the said Sunflower mechanism, prevents flame propagation to the walls of engine cylinder during power stroke.

The turbo-piston assembly moves upward during compression stroke, to cause high intensity compression swirl at the energy center, the said high intensity compression swirl causes air-fuel mixture to burn completely at the energy center.

Accordingly, among the objects of the subject technology are: the provision of an internal combustion engine that eliminates heat lost to a cooling medium and exhaust gases which subsequently eliminate the need for a cooling system for the cylinders of the internal combustion engine. Another object of the subject technology is to improve the efficiency of fuel combustion within the cylinder of an internal combustion engine.

It should be appreciated that the present technology can be implemented and utilized in numerous ways, including without limitation as a process, an apparatus, a system, a device, a method for applications now known and later developed. These and other unique features of the technology disclosed herein will become more readily apparent from the following description and the accompanying drawings.

DESCRIPTION OF DRAWINGS

So that those having ordinary skill in the art to which the disclosed technology appertains will more readily understand how to make and use the same, reference may be had to the following drawings.

DESCRIPTION OF REFERENCE NUMERALS

Figure 1:
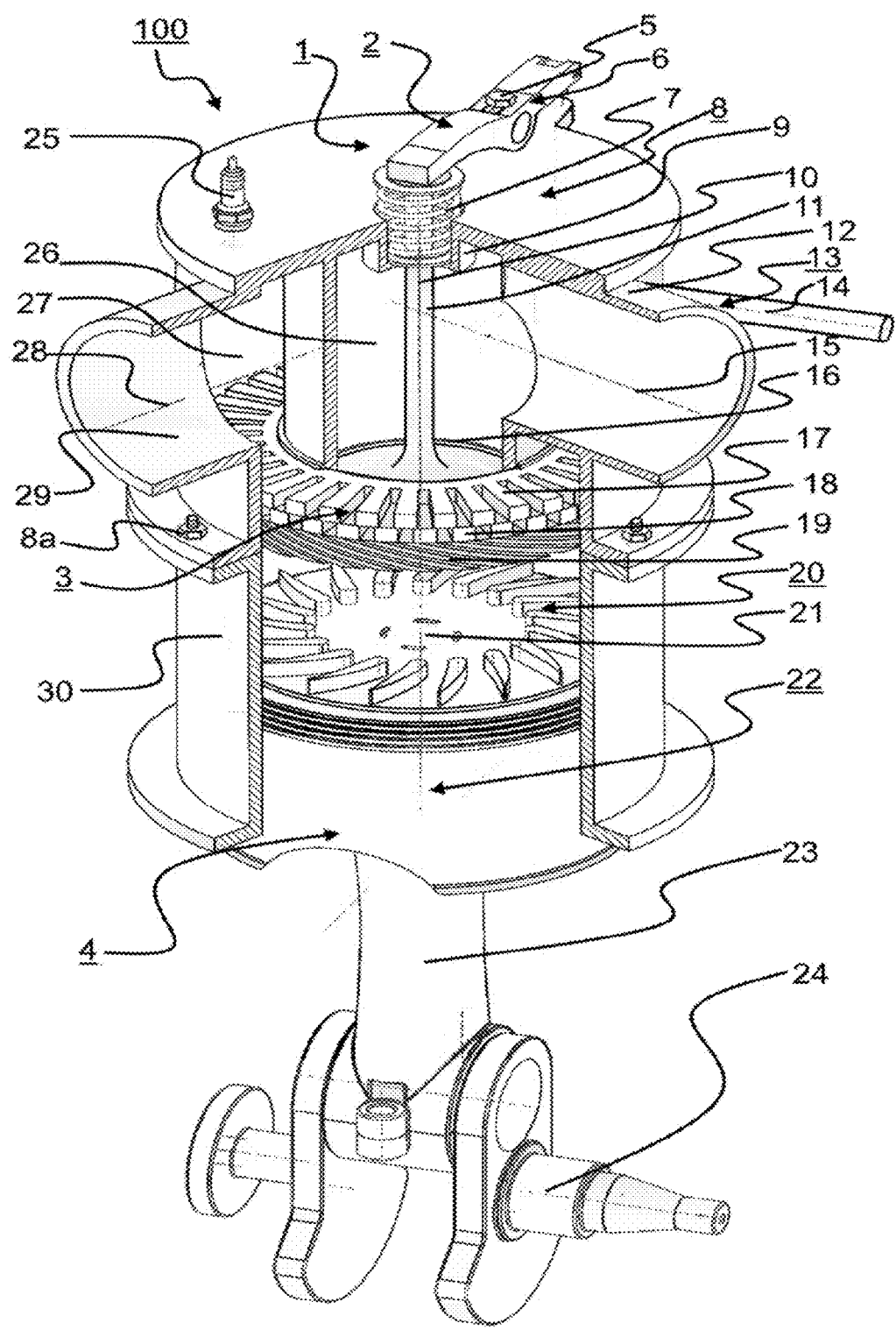
FIG. 1 is a sectional view of an engine in accordance with the subject technology.

1 . . . Cylinder head assembly
2 . . . Exhaust valve mechanism
3 . . . Sunflower valve mechanism
4 . . . Turbo-piston assembly 5 . . . Rocker arm adjusting screw.
6 . . . Rocker arm
7 . . . Exhaust valve spring
8 . . . Cylinder head body
8a . . . Fastening studs and bolts for Engine cylinder and cylinder head assembly.
9 . . . Stepped hole for Exhaust valve spring.
10 . . . Cylinder axis
11 . . . Exhaust valve
12 . . . Exhaust manifold
13 . . . Cam shaft
14 . . . Cam shaft axis
15 . . . Exhaust manifold axis
16 . . . Exhaust valve seat
17 . . . Sunflower valve upper guide
17a . . . Sunflower valve upper guide radial channels.
18 . . . Sunflower valve
18a . . . Sunflower valve radial channels.
19 . . . Sunflower valve lower guide.
19a . . . Sunflower valve lower guide radial channels.
20 . . . Impeller
20a . . . Impeller shaft
21 . . . Energy center
22 . . . Piston
23 . . . Connecting rod
24 . . . Crankshaft
25 . . . Igniter plug
26 . . . Exhaust chamber
27 . . . Suction chamber
28 . . . Inlet manifold axis
29 . . . Inlet manifold
30 . . . Engine cylinder
31 . . . Fuel injector
32 . . . Push rod
33 . . . Exhaust valve cam follower
34 . . . Exhaust valve cam
35 . . . Sunflower valve upper guide lock
36 . . . Sunflower valve lock
37 . . . Sunflower valve spring
38 . . . Cylindrical cam
39 . . . Cylindrical cam follower
39a . . . Cylindrical cam follower axis.
39b . . . Cylindrical cam follower at closed position
39c . . . Cylindrical cam follower at mean position
39d . . . Cylindrical cam follower at open position
39e . . . Cylindrical cam follower swing angle
40 . . . Bracket for camshaft and pushrod bearing support
41 . . . Slot for cylindrical cam follower angular movement
42 . . . Sunflower valve assembly stopper
43 . . . Recess to receive Sunflower valve assembly circlip.
44 . . . Stepped hole to receive exhaust valve seat
45 . . . Sunflower valve assembly circlip
46 . . . Sunflower valve lock housing
47 . . . Rectangular groove for Sunflower valve angular play
48 . . . Sunflower valve spring seat
49 . . . Sunflower valve lower guide lock
50 . . . Sunflower valve assembly cover
51 . . . Serrations on valve locks
52 . . . Cylindrical cam follower path
53 . . . piston pin
54 . . . Impeller circlip
55 . . . Air fuel mixture flow in suction stroke
56 . . . Circumferential swirl
57 . . . High intensity compression swirl (HICS)
58 . . . Combustion of gases
59 . . . Exhaust valve open
60 . . . Exhaust gas flow
61 . . . SF valve upper guide mating surface with valve lock housing
62 . . . SF valve lower guide mating surface with valve lock housing
63 . . . Valve lock housing mating surface with SF valve upper guide
64 . . . Valve lock housing mating surface with SF valve lower guide Sunflower Valve and Impeller Dimensions
D . . . Diameter of Sunflower valve
d . . . Inner diameter of Sunflower valve
θ . . . Port angle
φ . . . Petal angle
h1 . . . Height of Sunflower valve upper guide
h2 . . . Height of Sunflower valve
h3 . . . Height of Sunflower valve lower guide
α . . . Circumferential swirl angle
β . . . Impeller swirl angle

DESCRIPTION OF THE PREFERRED EMBODIMENTS

The subject technology relates to the Sunflower mechanism or inlet valve mechanism and the turbo-piston assembly of an internal combustion (IC) engine, and in particular to methods of eliminating cooling losses, increasing the combustion efficiency and reducing harmful emissions. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as left, right, up, and down are with reference to the Figures, and not meant in a limiting sense. Additionally, for clarity common items have not been included in the Figures as would be appreciated by those of ordinary skill in the pertinent art. Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

As will hereinafter be more fully described, the instant self-cooled engine provides an engine design that cools the cylinder walls and ensures complete combustion of fuel within the cylinder. This subject technology eliminates the need for a separate cooling system, thereby eliminating accessories like a coolant pump, thermostat and fan which consumes considerable engine power.

Referring to FIG. 1, a sectional view of engine is shown and referred to generally by the reference numeral 100. The engine 100 includes a cylinder head assembly (1) which comprises a cylinder head body (8), a rocker arm (6), a Sunflower valve mechanism (3), an exhaust valve mechanism (2), a fuel injector, an igniter plug (25), an inlet manifold (29), an exhaust manifold (12), an engine cylinder (30) and turbo-piston assembly (4).

The cylinder head body (8) is in the form two concentric cylindrical blocks where Outer cylindrical block is called suction chamber (27) and inner cylindrical block is called exhaust chamber (26). The inlet manifold (29) connected to the Suction chamber (27), which contains Sunflower valve mechanism (3). Sunflower valve mechanism (3) is concentrically disposed into the annular space of the cylinder head body (8). Exhaust chamber (26) contains the exhaust valve mechanism (2) and connected to exhaust manifold (12). An exhaust valve spring (7) seats on the stepped hole (9) of the cylinder head body (8). The rocker arm (6) is disposed on the top surface of cylinder head body (8), which keeps the exhaust valve (11) in a closed position by means of an exhaust valve spring (7).

Figure 2:
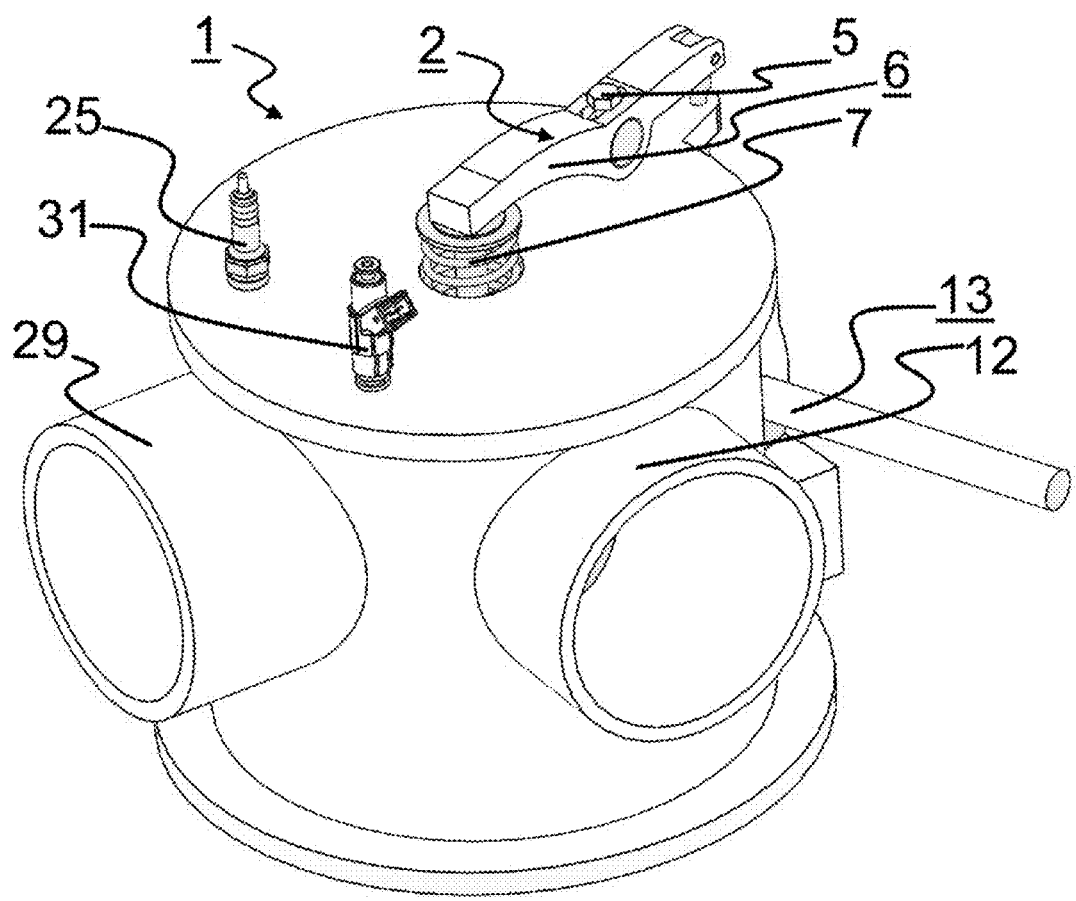
FIG. 2 is a cylinder head body showing the inlet and exhaust manifolds for the engine of FIG. 1.
Figure 3:
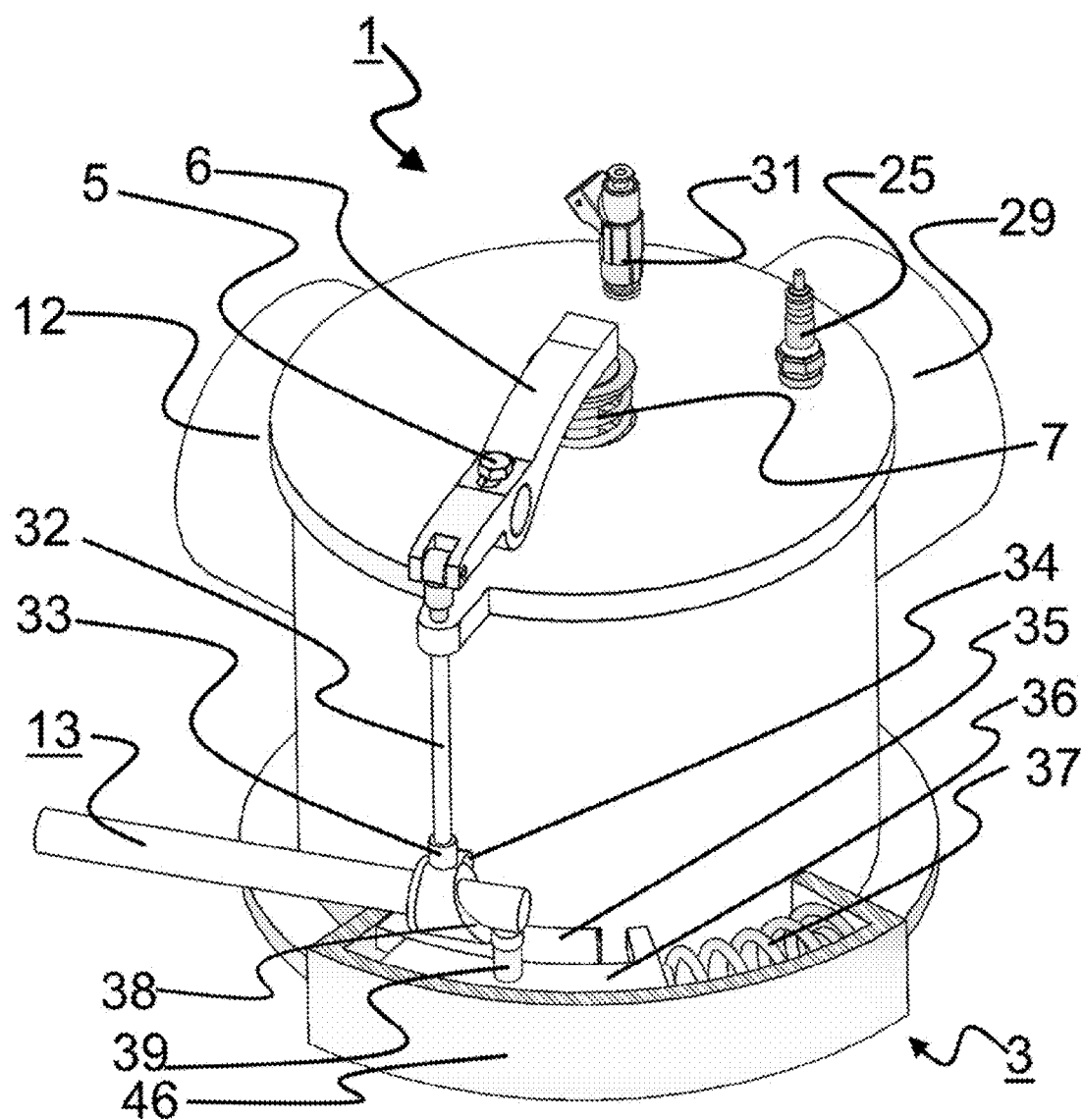
FIG. 3 is a cylinder head body showing the Sunflower valve and exhaust valve mechanisms for the engine of FIG. 1.
Figure 4:
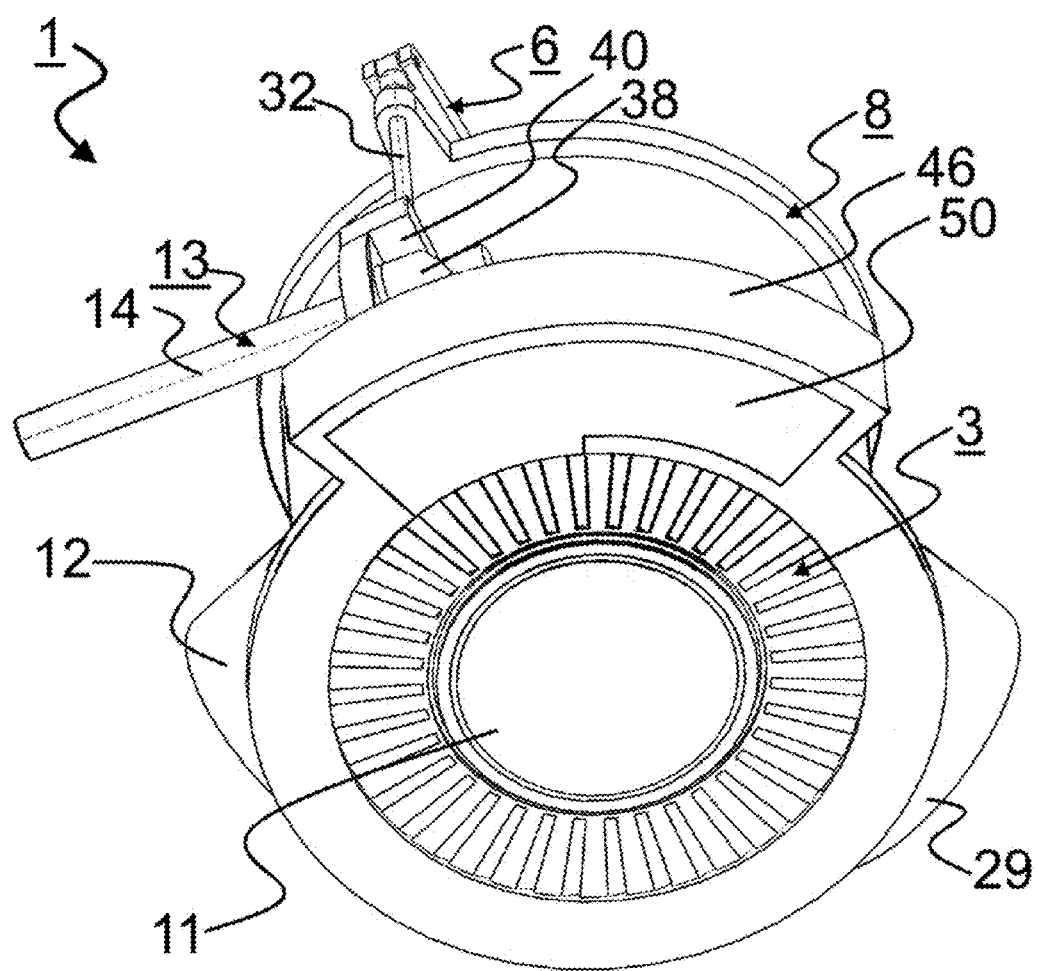
FIG. 4 is a bottom view of cylinder head assembly for the engine of FIG. 1
Figure 7:
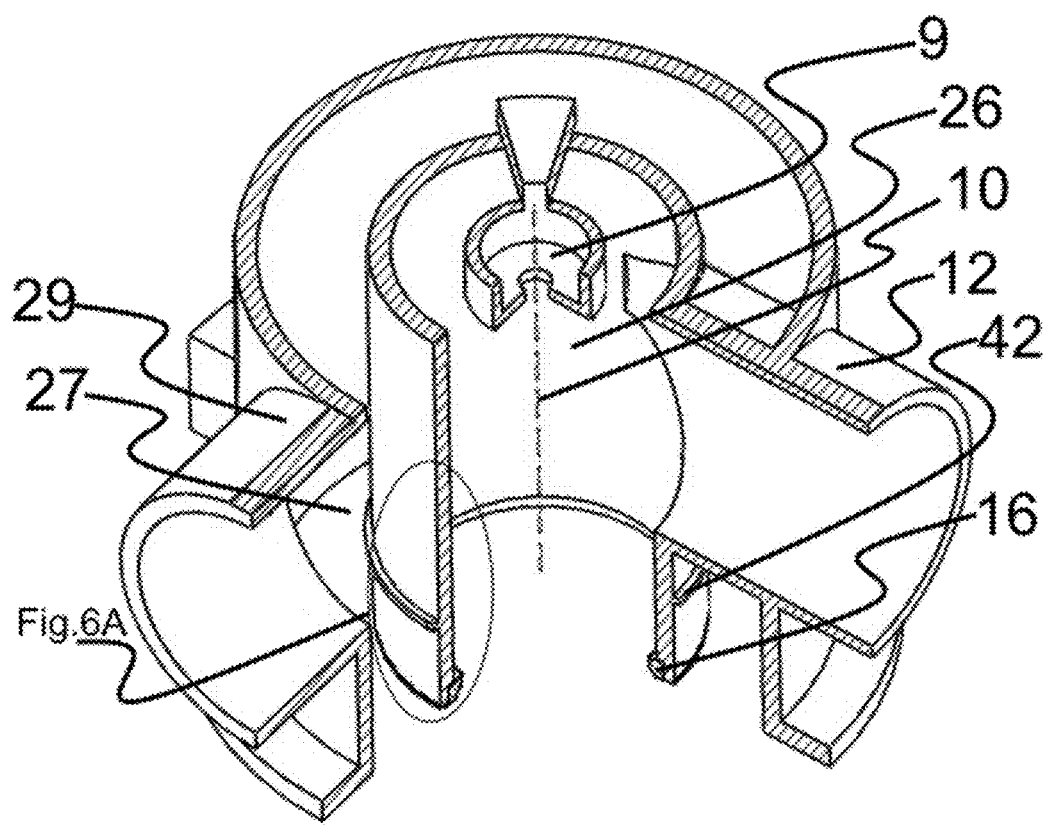
FIG. 7 is a complete sectional view of cylinder head for the engine of FIG. 1.

The exhaust manifold (12) and exhaust chamber (26) are in the form of an elbow (best seen in FIG. 7) which is integral part of the cylinder head body (8). Exhaust chamber (26) consists of exhaust valve (11) which is seated on exhaust valve seat (16) against the exhaust valve spring (7) force. Threaded holes on the cylinder head body (8) receive the igniter plug (25) to supply series of sparks and the fuel injector (31) to inject fuel into the suction chamber (27). The angle between inlet manifold (29) and exhaust manifold (12) axes between the range of 70°-90°. FIG. 2, FIG. 3 and FIG. 4 are different views of cylinder head assembly for better understanding and clarity.

Figure 5:
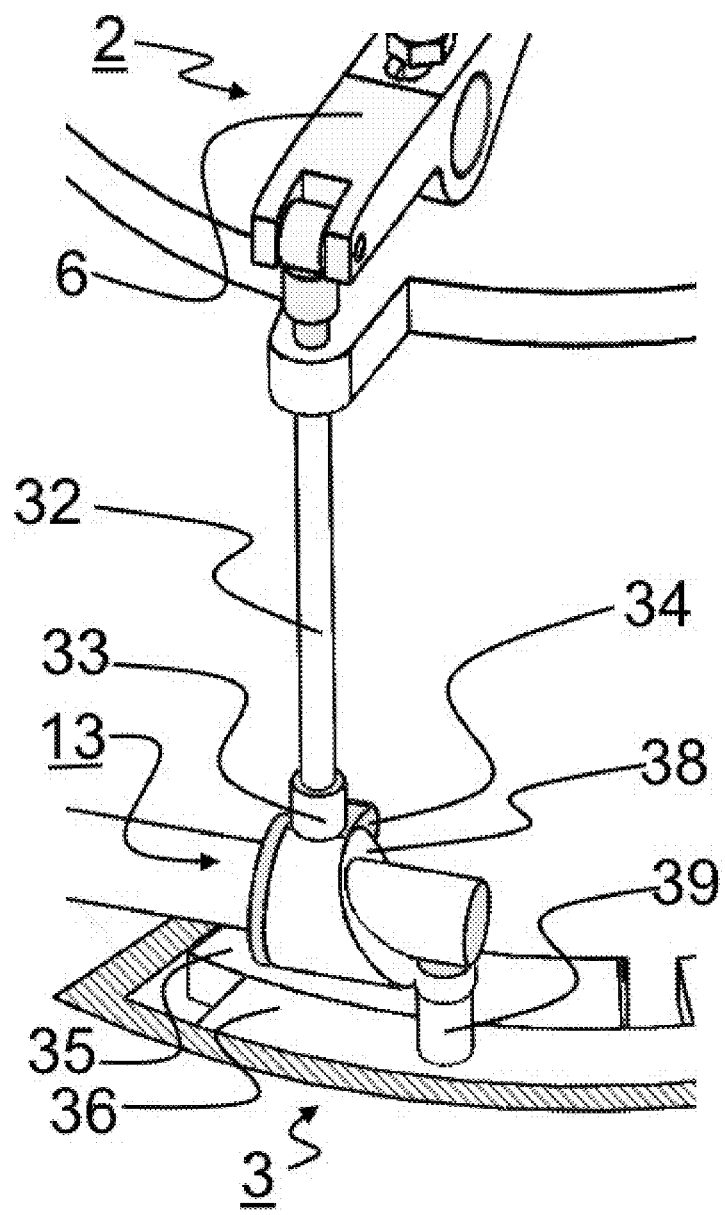
FIG. 5 is an enlarged view of the cam and followers with Sunflower upper guide lock and Sunflower valve lock exposed for the engine of FIG. 1.
Figure 6:
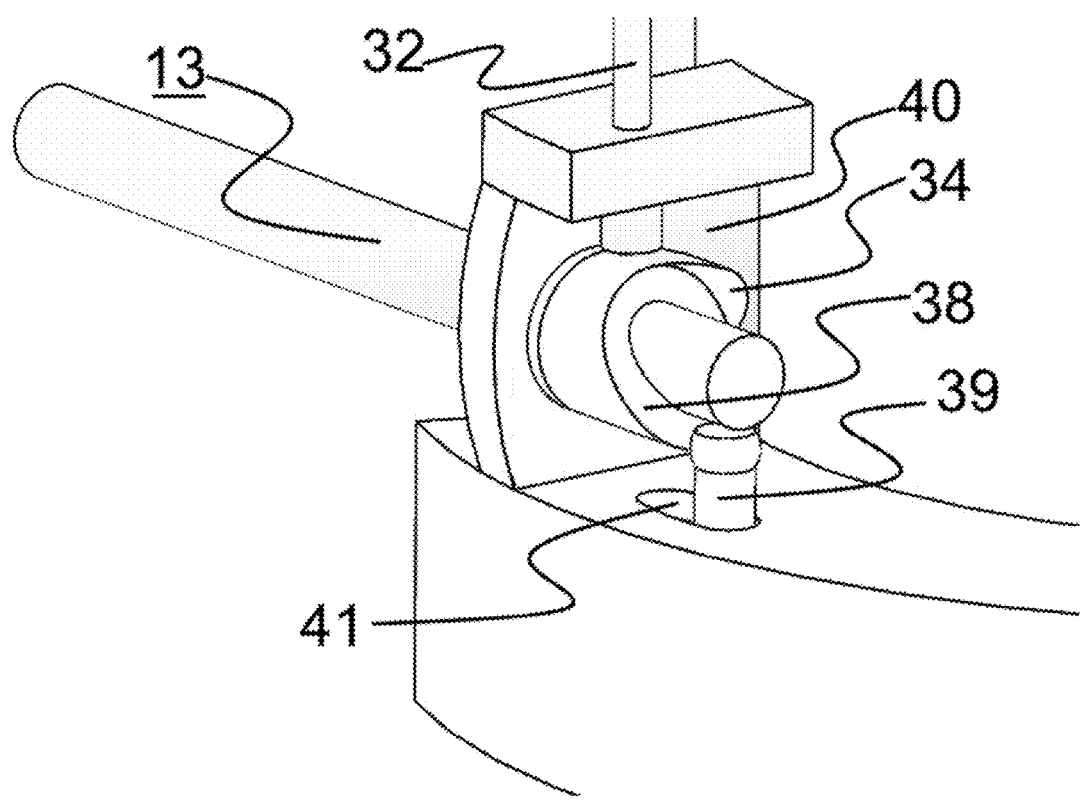
FIG. 6 is a cylindrical cam follower that moves in an angular slot to open and close the Sunflower valve for the engine of FIG. 1.
Figure 8:
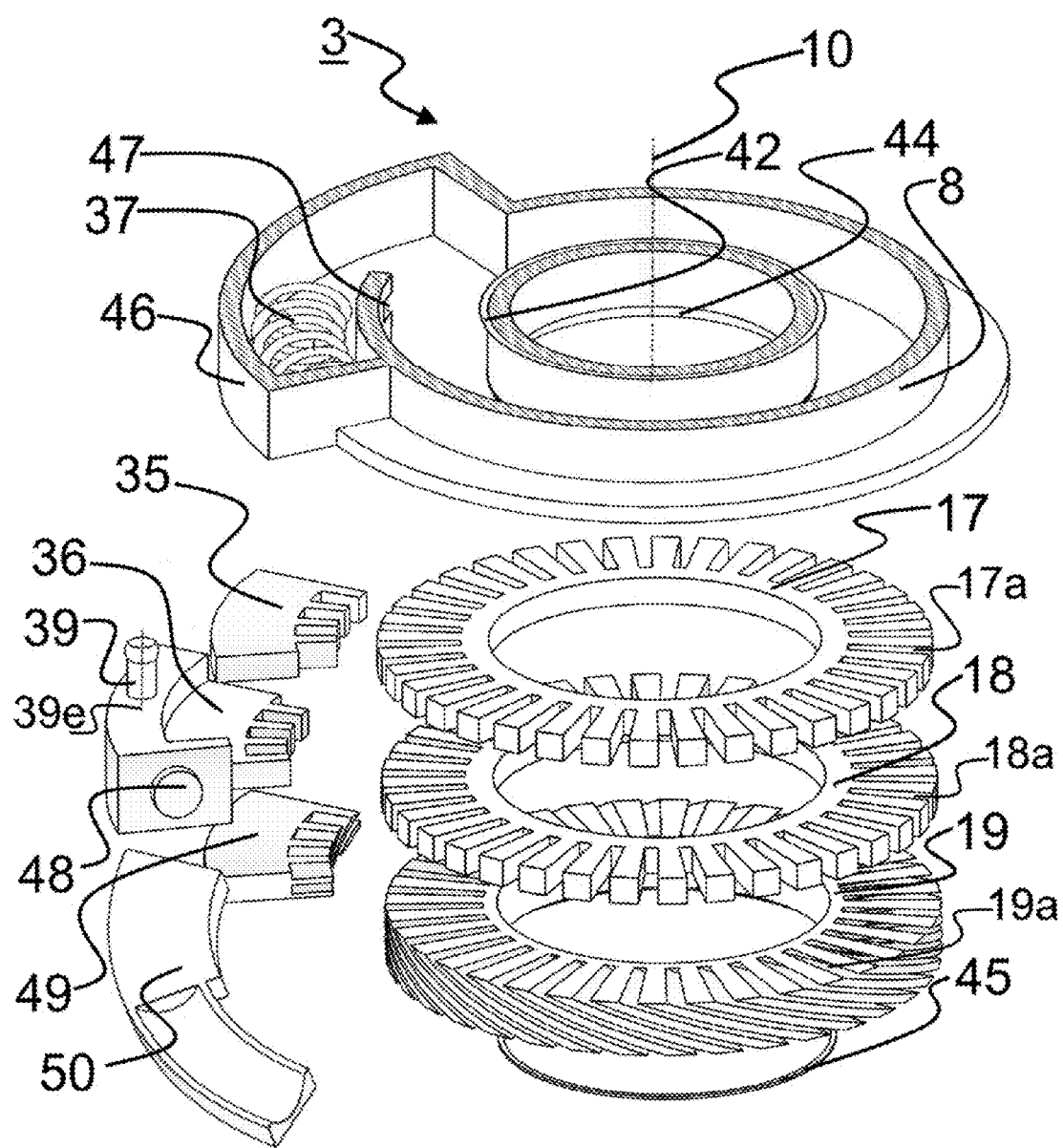
FIG. 8 is an exploded view of Sunflower valve mechanism for the engine of FIG. 1.

In the engine 100, circumferential suction is achieved by the Sunflower valve mechanism (Best seen in exploded view FIG. 8). The Sunflower valve mechanism (3) derives its name because the Sunflower valve mechanism (3) resembles the petals of the Sunflower. The Sunflower valve mechanism (3) is operated by cylindrical cam (38) to provide the angular movement to open and close the Sunflower valve mechanism (3). The exhaust valve (11) is operated by an Exhaust valve cam (34), which is conventional lobe cam and exhaust valve cam follower (33) (Best seen in FIG. 5 & FIG. 6). Both the exhaust valve cam (34) and cylindrical cam (38) are formed on the camshaft (13).

Figure 9:
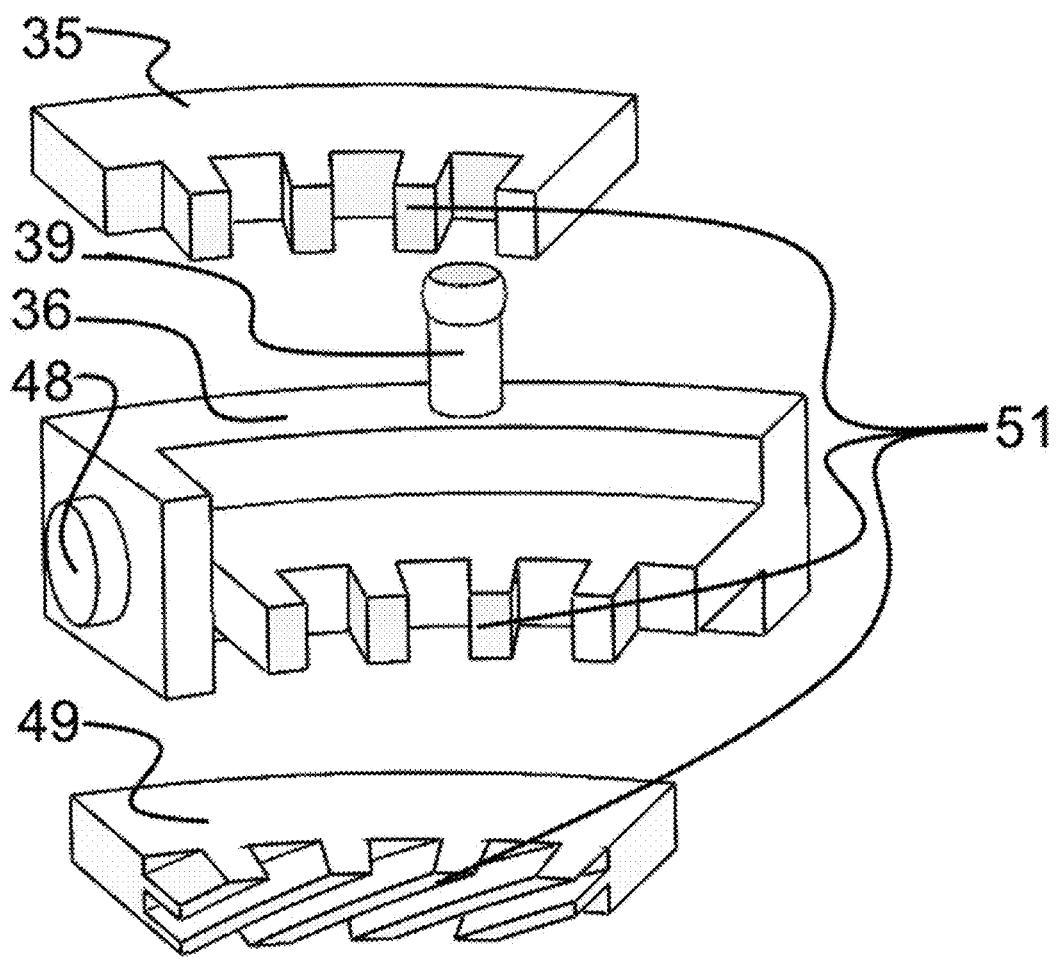
FIG. 9 is serrations on the valve locks which mate with the Sunflower valve and Sunflower valve guides for the engine of FIG. 1.

Sunflower valve (18) is sandwiched between a Sunflower valve upper guide (17) and a Sunflower valve lower guide (19). The Sunflower valve upper and lower guides (17, 19) are fixed into the cylinder head body (8) by a Sunflower valve upper guide lock (35) and a Sunflower valve lower guide lock (49) to remain stationary. The Sunflower valve lower guide (19) has helical shaped radial channels (19a), which provides inlet passage for ingress of air-fuel mixture in a helical direction. The serrations (51) on the guide locks (35, 49) fit into the Sunflower valve guides (17, 19) which prevents the rotation of Sunflower valve guides (17, 19) when the Sunflower valve (18) is in motion (Best seen in FIG. 9). Sunflower valve (18) swing through the rectangular groove (47) to open and permit the air-fuel mixture flow into the cylinder. Sunflower valve assembly is closed at the bottom by Sunflower valve assembly cover (50).

Figure 7A:
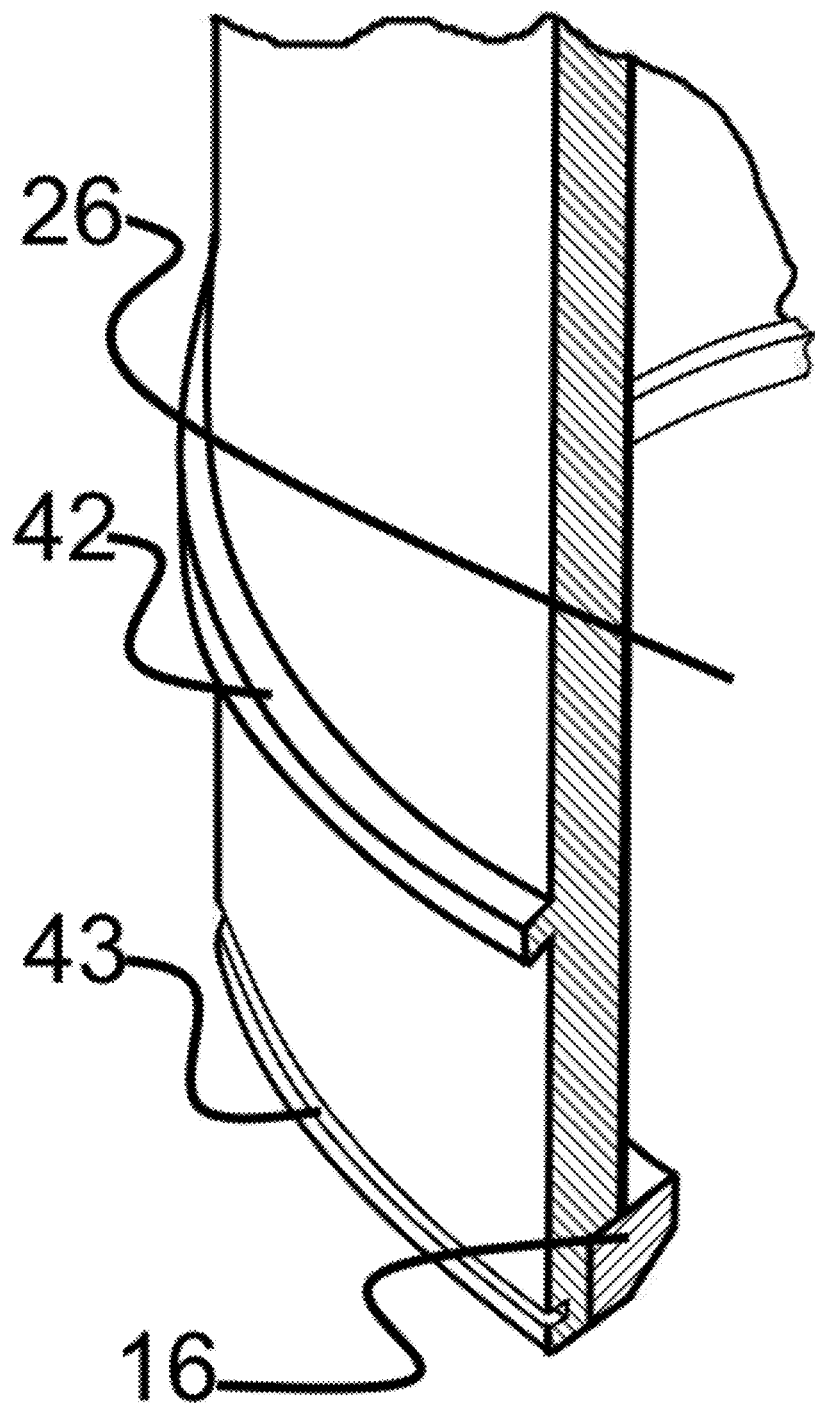
FIG. 7A is enlarged view of Sunflower valve assembly stopper, exhaust valve seat and recess to receive Sunflower valve assembly circlip.

Sunflower valve mechanism is held between a Sunflower valve assembly stopper (42) and a Sunflower valve assembly circlip (45) (Best seen in enlarged view FIG. 7A). Sunflower valve assembly stopper is the annular protrusion outside of exhaust chamber to stop the upward movement of Sunflower valve mechanism (3) and is secured by Sunflower valve assembly circlip (45) to prevent axial movement downwards. The Sunflower valve lower guide (19) has larger height (h3) compared to height (h1) of Sunflower valve upper guide (17), to provide more gliding path for the incoming air and less heat transfer to the Sunflower valve mechanism (3). The less heat transfer to the Sunflower valve mechanism (3) ensures minimum thermal expansion and smoother action. The height (h1) of Sunflower valve upper guide (17) and height (h2) of Sunflower valve (18) are equal and smaller than the height (h3) of Sunflower valve lower guide (19). The upward thrust due to gas pressure ensures air tight sealing irrespective of wear and tear of the mating surfaces. It requires all the mating surfaces of Sunflower valve guides (17, 19) and Sunflower valve (18) are perfectly lapped so that minimum force is needed to actuate it.

Figure 10:
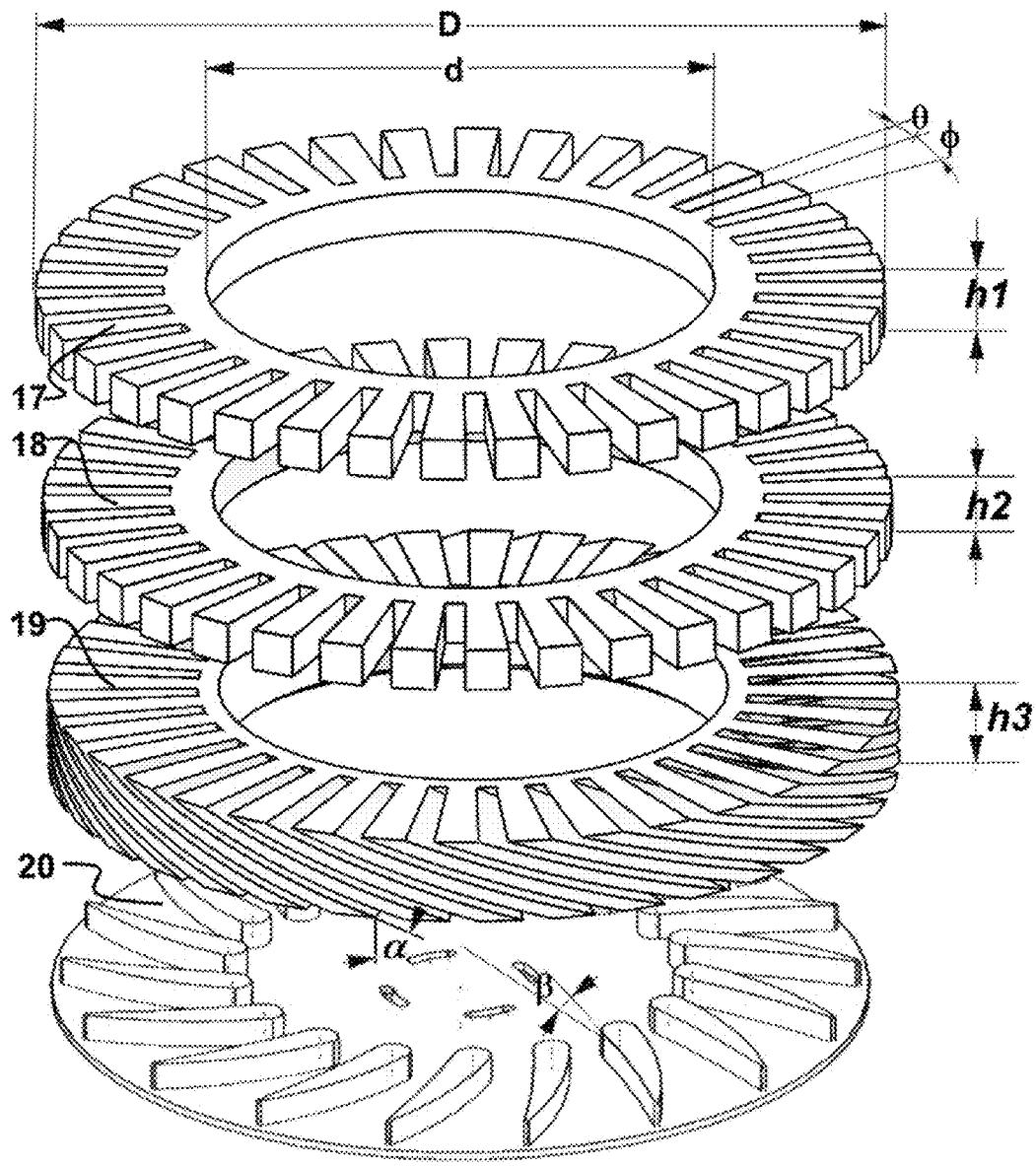
FIG. 10 illustrates important dimensions of the Sunflower valve and the impeller for the engine of FIG. 1.

The Sunflower valve (18) used in this engine has 36 petals (Refer FIG. 10 for the Sunflower valve mechanism terminology). The Sunflower valve mechanism (3) has a petal angle ($\phi$) of 6° against the port angle ($\theta$) of 4° so that the Sunflower valve (18) can completely cover the radial channels with overlap angle of 1°. The total angular movement of 5° is needed to open the Sunflower valve mechanism (3) by means of cylindrical cam (38) and the cylindrical cam follower (39). The angular play of the cylindrical cam (38) can be reduced by increasing the number of petals in Sunflower valve (18).

Figure 11:
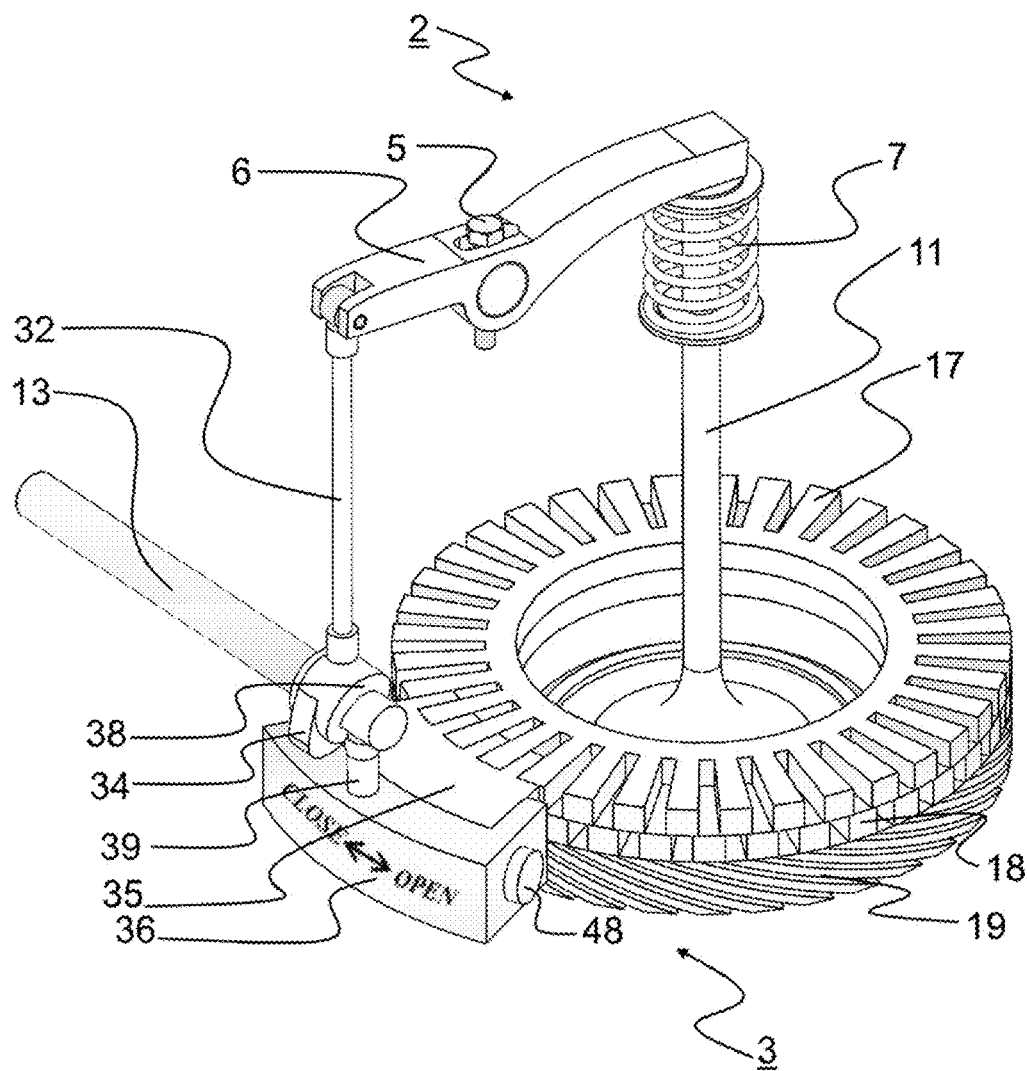
FIG. 11 is a Sunflower valve mechanism in the closed position for the engine of FIG. 1.
Figure 12:
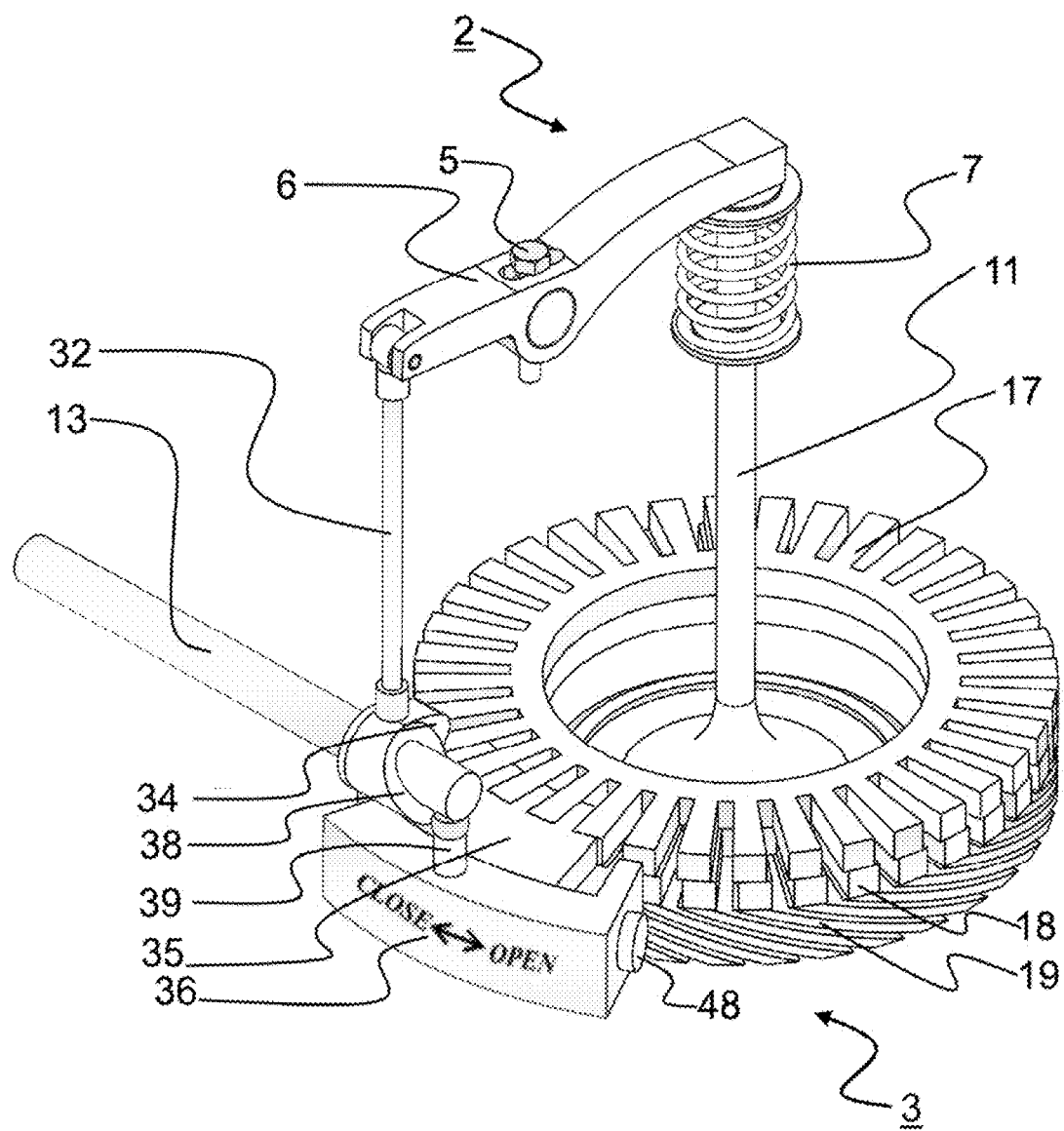
FIG. 12 is a Sunflower valve mechanism in the open position for the engine of FIG. 1.
Figure 13:
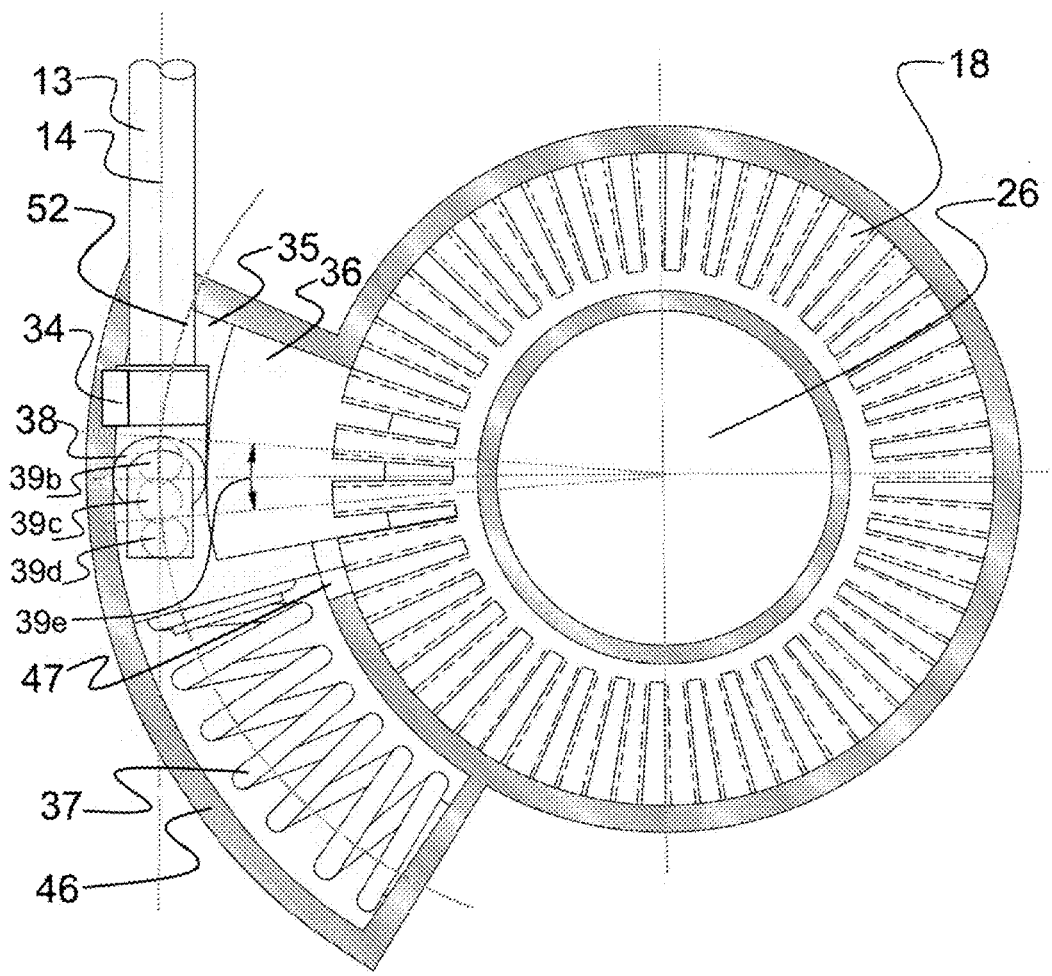
FIG. 13 is a sectional view of the cylinder head assembly along the flat surface of Sunflower valve upper guide, showing cylindrical cam follower positions with respect to the camshaft axis for the engine of FIG. 1.

Referring to FIG. 11, Sunflower valve (18) is in closed position by the Sunflower valve spring (37) force, which is seated on Sunflower valve spring seat (48). Referring to FIG. 12 Sunflower valve (18) is in open position against the Sunflower valve spring (37) force. FIG. 13 refers to cylindrical cam follower (39) positions with respect to camshaft axis (14). Cylindrical cam follower at closed position (39b) and cylindrical cam follower at open position (39d) are the extreme points of travel of the cylindrical cam follower (39). Follower mean position (39c) is the point when the camshaft axis and cylindrical cam follower axis (39a) coincides. As the cylindrical cam follower (39) moves in circular path, the follower axis (39a) shifts from camshaft axis (14) which is called follower offset. The follower offset should be minimum so that cylindrical cam (38) can exert maximum force on cylindrical cam follower (39). In order to reduce this offset, cylindrical cam follower swing angle (39e) should be equally divided from the follower mean position (39c).

Igniter plug (25) generate series of sparks when starting the engine and it is not timed. The purpose of the Igniter plug (25) is to initiate combustion at starting similar to combustor used in gas turbines. For multi cylinder engines single igniter plug can be used. Injector injects the fuel into the suction chamber during suction stroke.

Figure 14:
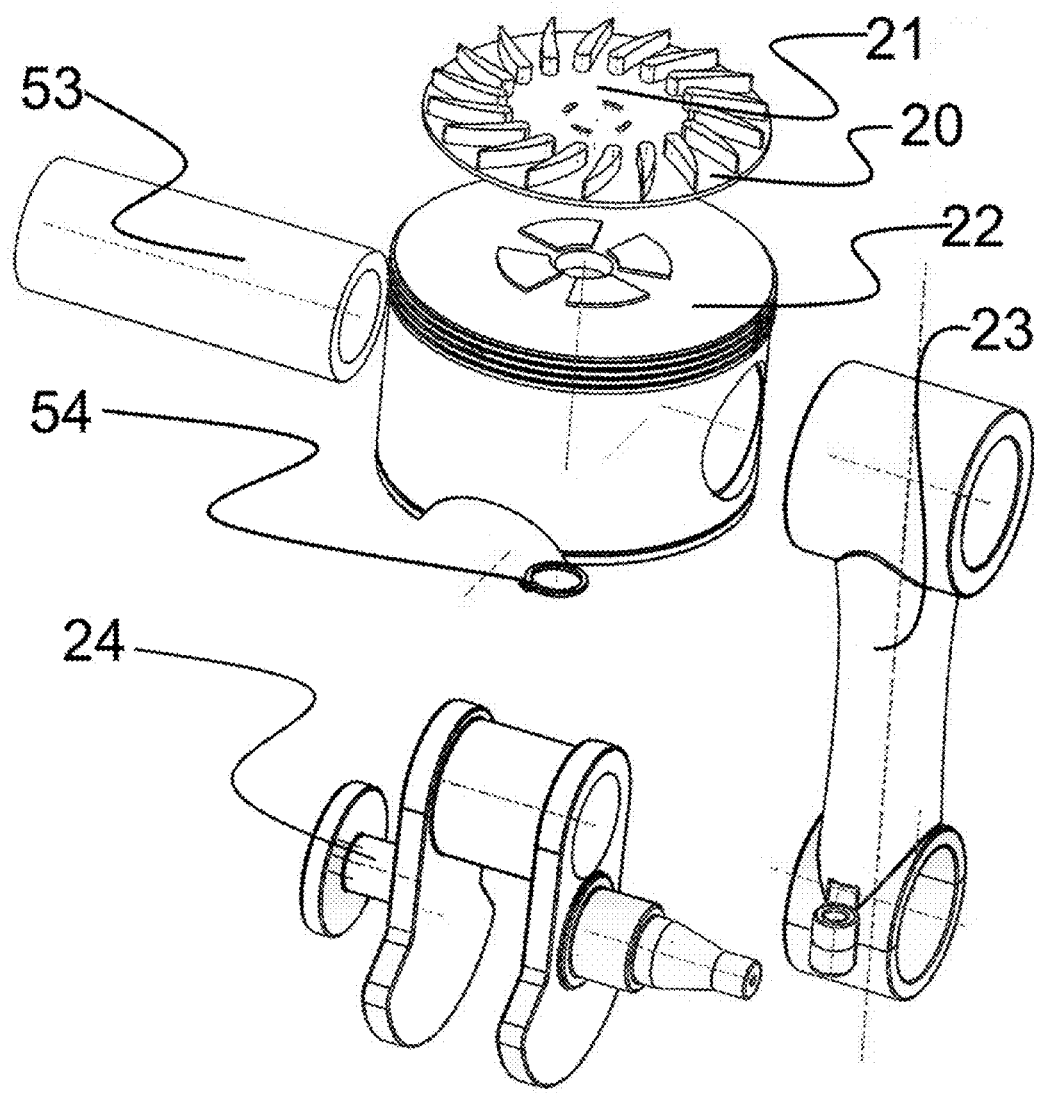
FIG. 14 is an exploded view of the turbo-piston assembly for the engine of FIG. 1.
Figure 15:
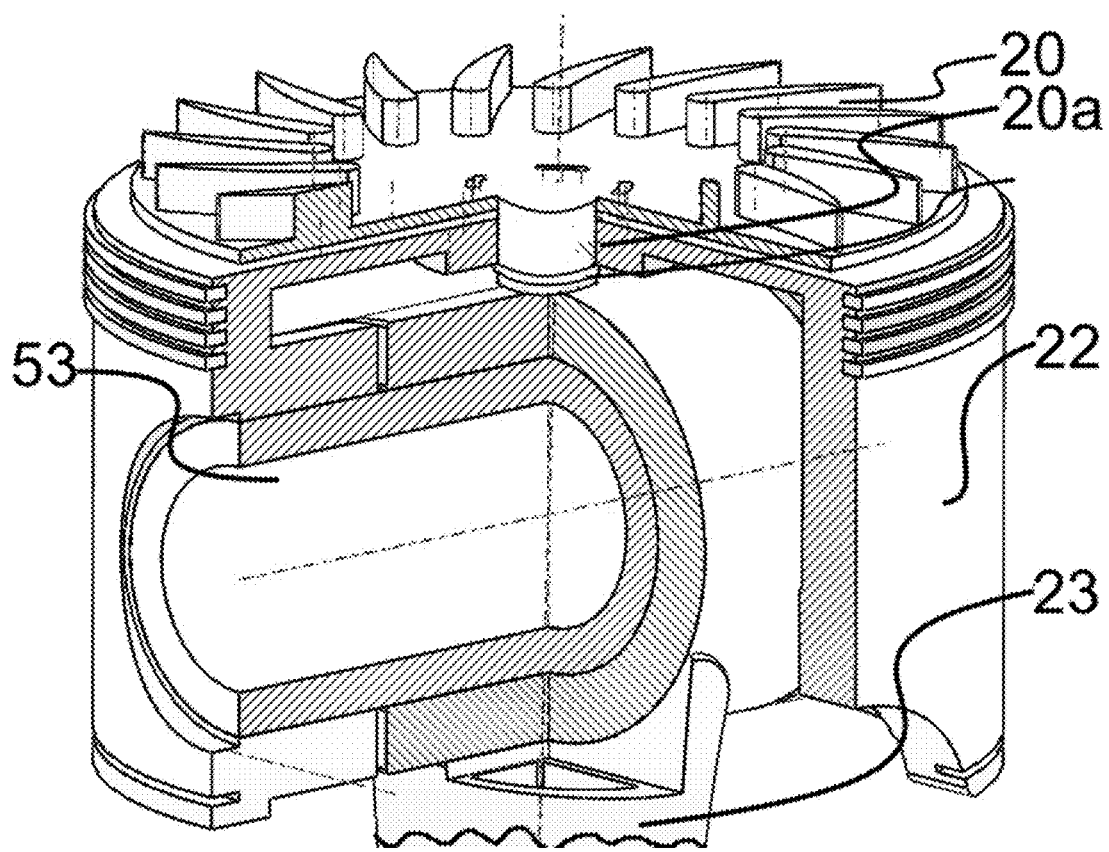
FIG. 15 is a sectional view of the turbo-piston for the engine of FIG. 1.
Figure 16:
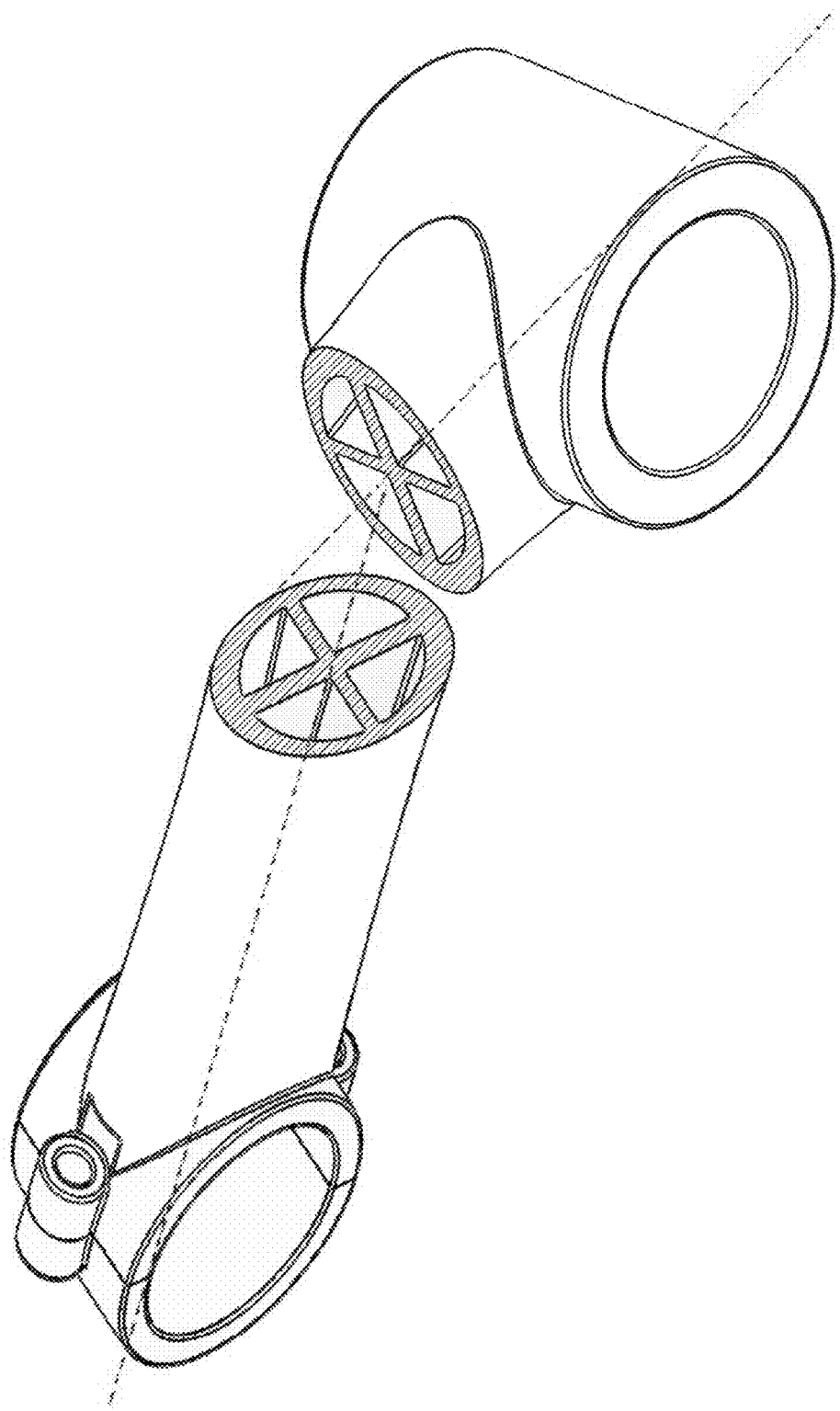
FIG. 16 is an O-positive construction of connecting rod to withstand torsional-compressive load for the engine of FIG. 1.

FIG. 14 shows the exploded view of the Turbo-piston assembly (4) and crankshaft. Referring FIG. 15 the impeller (20) is mounted on the piston using impeller shaft (20a) which is integral part of impeller and secured by impeller circlip (54). It can be freely rotated by the force of incoming air-fuel mixture. As the impeller rotates at high speed, torsional forces will be acting on the piston (22) along with compressive load and therefore turbo-piston assembly (4) is subjected to torsional—compressive load. In order to withstand this type of load conventional 'I' section connecting rod is replaced with ⊕ (pronounced as O-positive) connecting rod (23) (FIG. 16). The load acting on the impeller blades is safely transmitted to O positive connecting rod thus improves stability of engine at higher speeds.

In the engine (100) air-fuel mixture is sucked into the cylinder circumferentially called as circumferential suction. The swirling stream of air-fuel mixture sweeps away the heat from the cylinder walls when it enters during suction stroke. During compression stroke, compressed swirling of air-fuel mixture burns fuel molecules at the energy center (21) effectively.

The swirling stream of air-fuel mixture at the circumference of the cylinder is called circumferential swirl (56). Circumferential swirl (56) is responsible for cooling the cylinder walls as well as deflecting flame in such a way that it cannot touch the cylinder walls. The circumferential swirl

(56) also rotates the impeller (20) which acts as a fan for cooling the cylinder walls. The impeller is mounted on the piston which is called as turbo-piston assembly. Turbo-piston assembly aggravates swirling action during compression stroke to generate High intensity compression swirl or HICS (57).

The process of intensifying swirling to generate HICS is called as swirling exacerbation. In HICS the molecules move very closely with high velocity increases the chances of collision with each other. The circumferential swirl (56) prevent the flame propagation to the cylinder walls enhances the efficiency because less quantity of fuel is required to energize the energy center to perform the useful work on the piston.

The central part of the impeller is called energy center (21). This is the inner space of the impeller where the swirling of the air-fuel mixture gets aggravated to cause HICS (57). In this space high velocity molecules involve in multiple collisions to release their maximum energy within short period. There are two types of energy centers depends on the direction of HICS (57), Direct swirl energy center and counter swirl energy center.

In energy center the molecules moves in the orbit based on law of conservation of angular momentum depends on the molecular weight, the lighter molecules take smaller orbit, and heavier molecules take larger orbits. When the molecule enters the energy center, it breaks down into smaller molecules, take up the smaller orbits. The release of energy occurs until the molecule reaches smallest possible orbit or releases maximum energy.

Sweep factor is the major criteria to achieve effective cooling of the cylinder. Sweep factor is the ratio of bore diameter to effective cylinder length (clearance length+ stroke length).

Sweep factor=bore diameter/effective cylinder length (d/L) where L=c+1

Swirling exacerbation is the process of intensifying swirling action of air-fuel mixture to cause HICS (57). Swirling exacerbation depends on sweep factor, circumferential swirl angle ($\alpha$) and impeller swirl angle ($\beta$).

The energy center (21) of the cylinder of the present subject technology differs from the conventional combustion chamber in a way that it burns the fuel. During exhaust stroke always there is left over fire in the energy center. The left over fire possesses considerable energy for the subsequent cycles. The fuel is added just to supplement left over fire in order to maintain energy level of the energy center.

Figure 17:
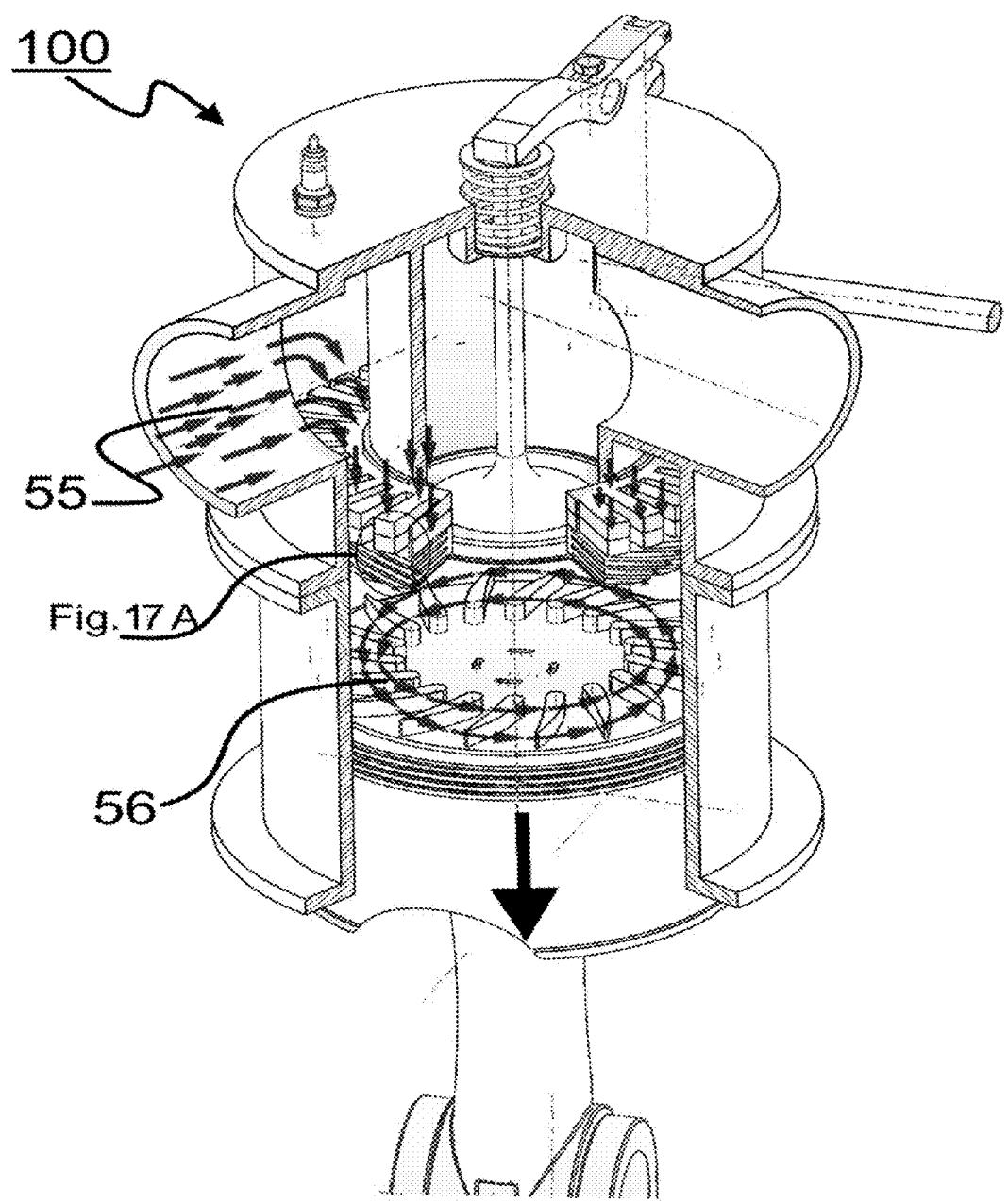
FIG. 17 is the engine during the suction stroke with arrows indicating air-fuel mixture flows through the intake manifold, suction chamber and Sunflower valve mechanism for the engine of FIG. 1.
Figure 17A:
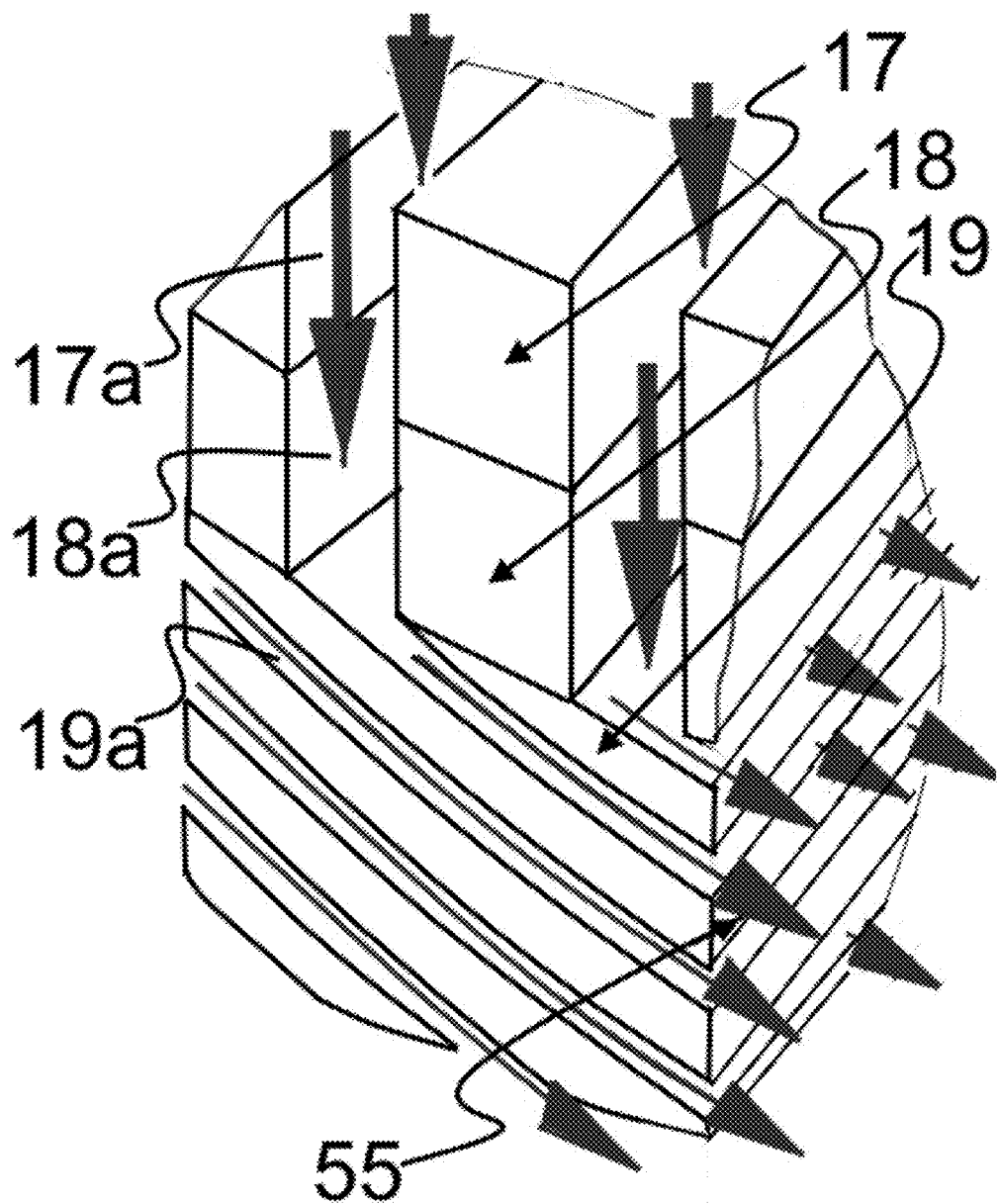
FIG. 17A is the partly enlarged view of the Sunflower valve assembly showing air-fuel mixture flow into the engine cylinder.

FIG. 17 shows the suction stroke, where the incoming air-fuel mixture enters through the inlet manifold (29) hits the exhaust chamber (26) and cools it. Igniter plug (25) generates series of Sparks and fuel injected into the suction chamber (27). The air flow through the inlet manifold bifurcated along the suction chamber and drives the injected fuel and spark to the cylinder through the Sunflower valve (18) during suction stroke. The channels (19a) of the Sunflower valve lower guide (19) are curved helically and acts as nozzles, which causes the air fuel mixture to swirl circumferentially with high velocity. The swirling stream of air impinges on the impeller blades causing the impeller (20) to rotate. This is called circumferential swirl (56) and the fuel is thoroughly atomized to ensure effective combustion.

Figure 18:
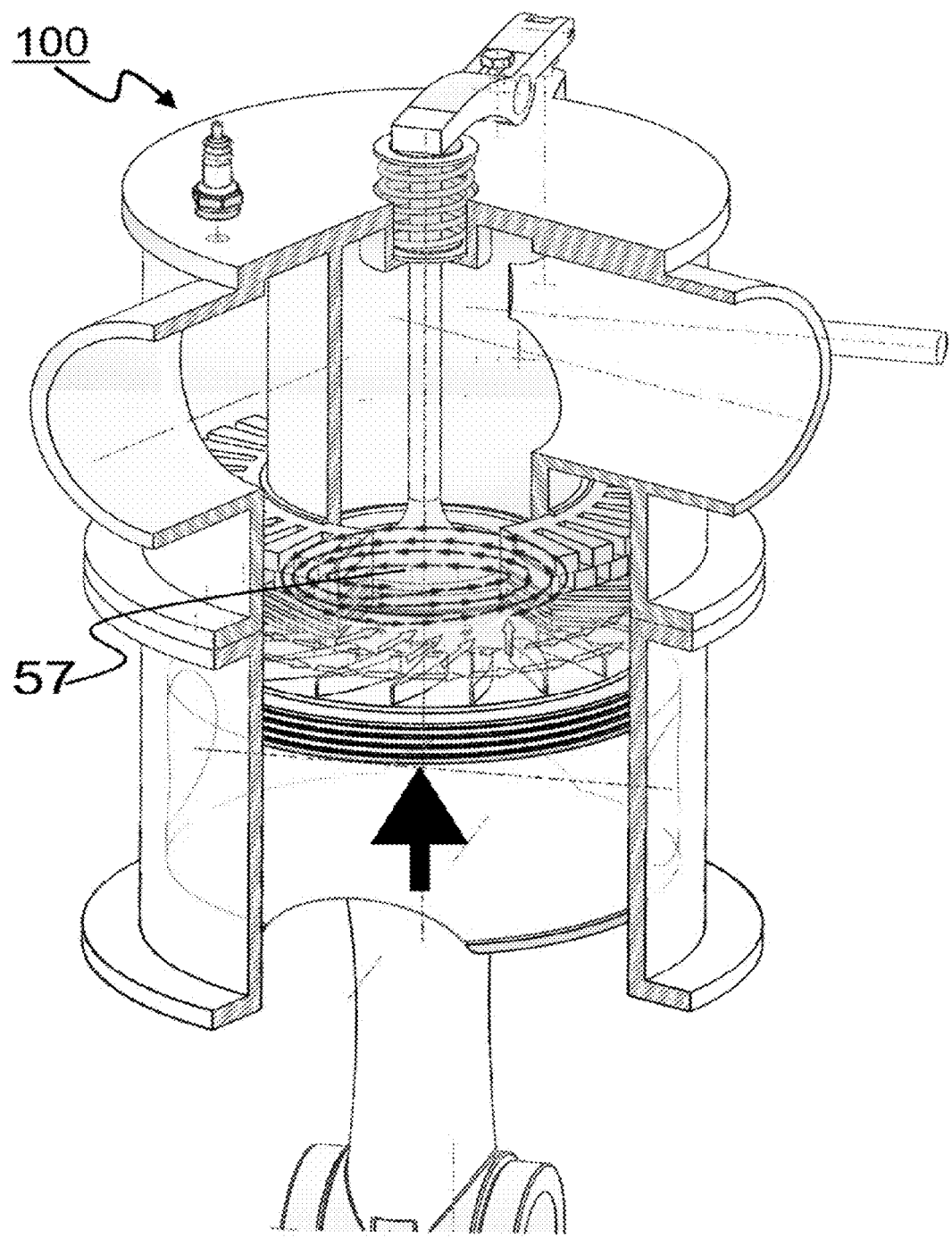
FIG. 18 is the engine during compression stroke with arrows at the energy center showing the intensified swirl (HICS) as a result of compression for the engine of FIG. 1.

FIG. 18 shows the compression stroke, where the Sunflower valve and exhaust valves are closed. The circumferential swirl gets aggravated to cause High intensity compression swirl or HICS (57) at the center of impeller. High intensity compression swirl (57) ensure every fuel molecule involve in multiple collisions to release maximum energy instantly.

Figure 19:
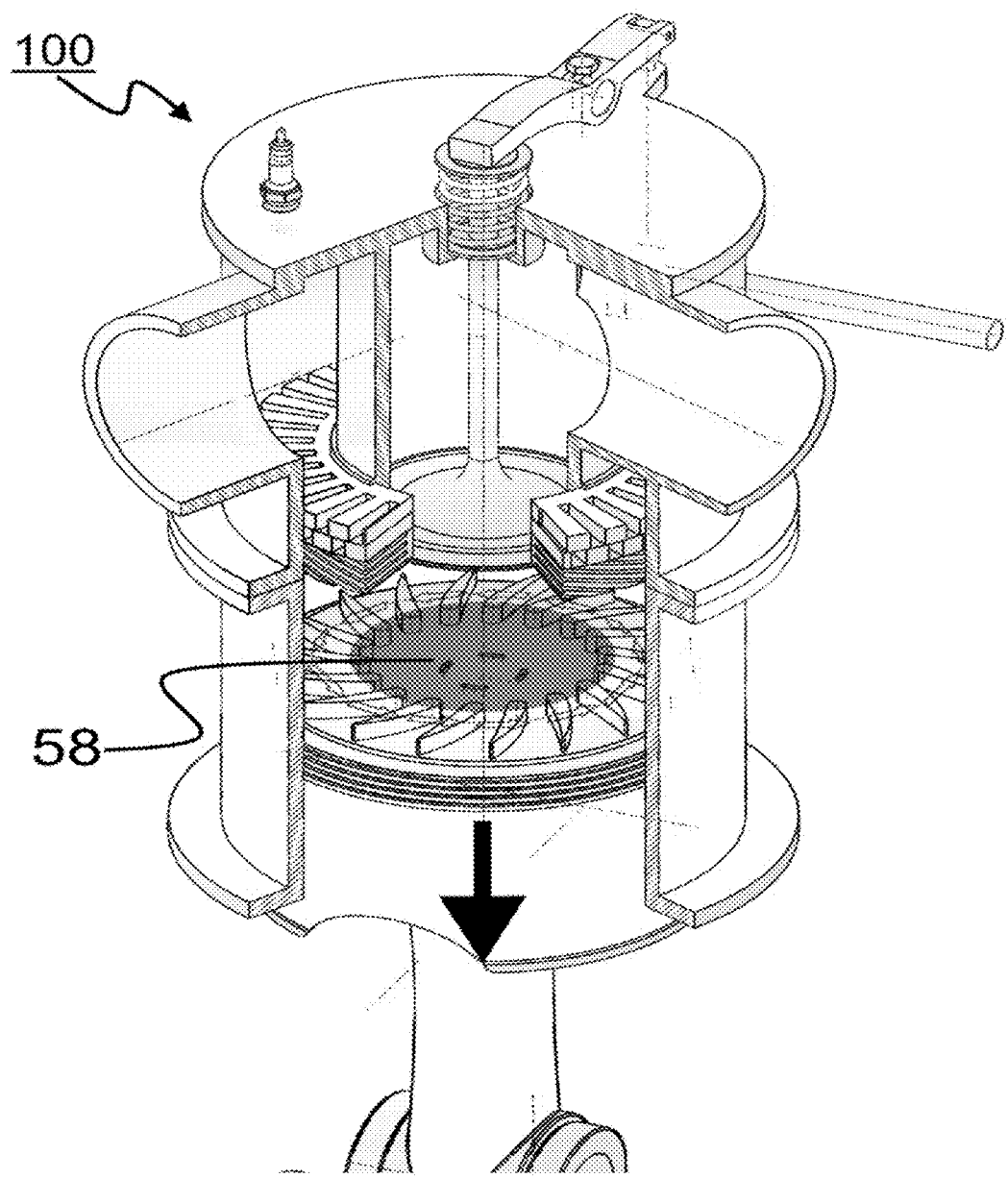
FIG. 19 is the engine during the power stroke for the engine of FIG. 1, which shows combustion of gases as disk of fire at the energy center.

FIG. 19 shows the power stroke, where the hot gases of combustion force the piston downwards to convert heat energy into mechanical energy. The flame is generated in the form of disk of fire (58). The flame cannot reach the cylinder walls because of the following reasons.

The bore diameter is greater than stroke length. Piston travel ceases very shortly and therefore not enough time for the flame to reach the cylinder walls.

Impeller blades deflect the flame from not reaching cylinder walls

The supplied fuel is just enough to be burned in the energy center.

Figure 20:
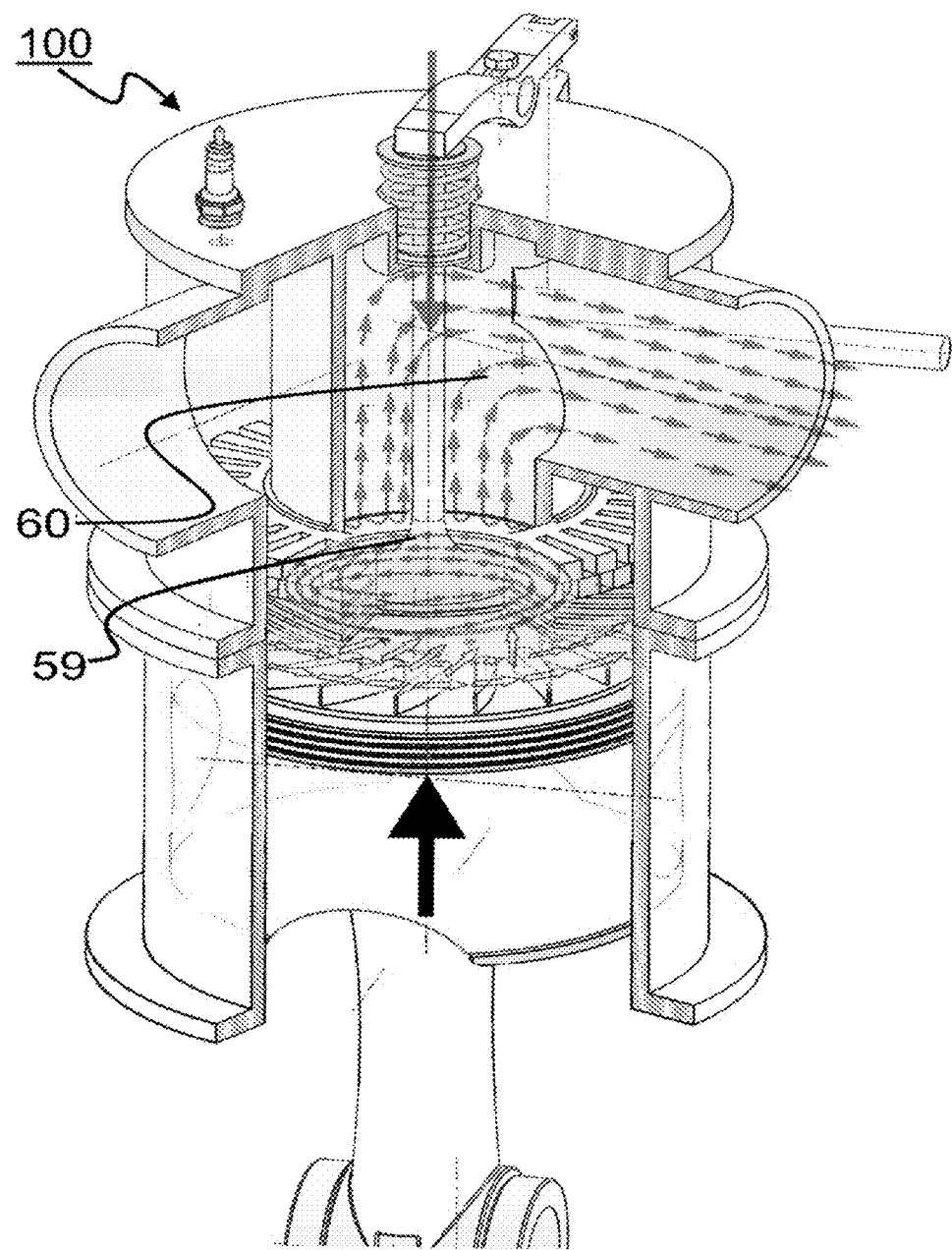
FIG. 20 is the engine during the exhaust stroke with arrows showing burnt gases leaving the cylinder through exhaust manifold for the engine of FIG. 1.
Figure 21:
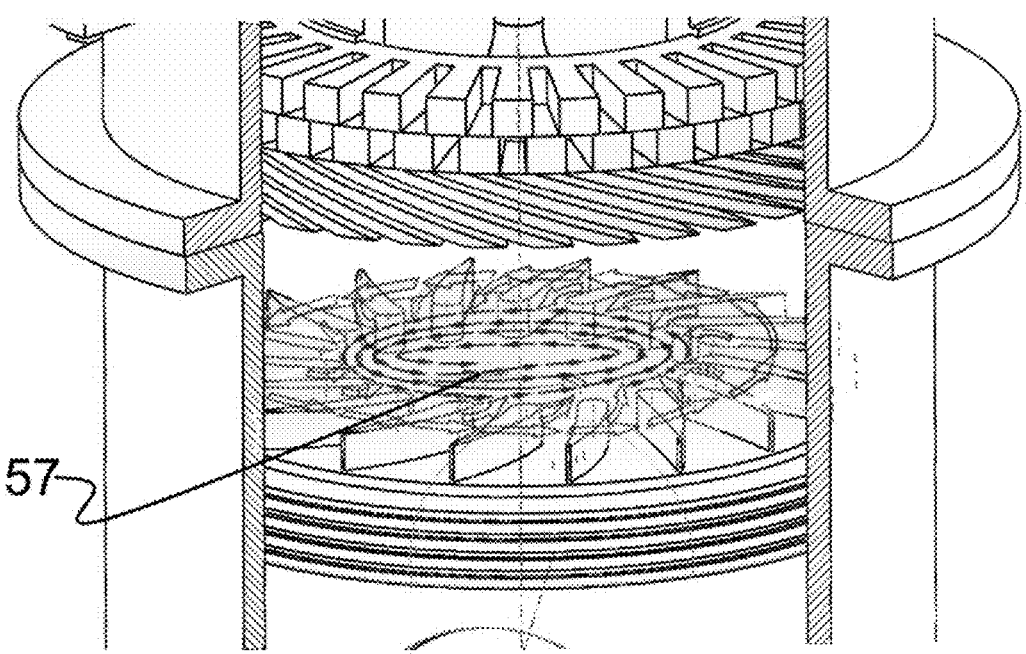
FIG. 21 is a Direct swirl energy center (DSEC) with arrows at the energy center showing the direction of the HICS being same to the circumferential swirl for the engine of FIG. 1.
Figure 22:
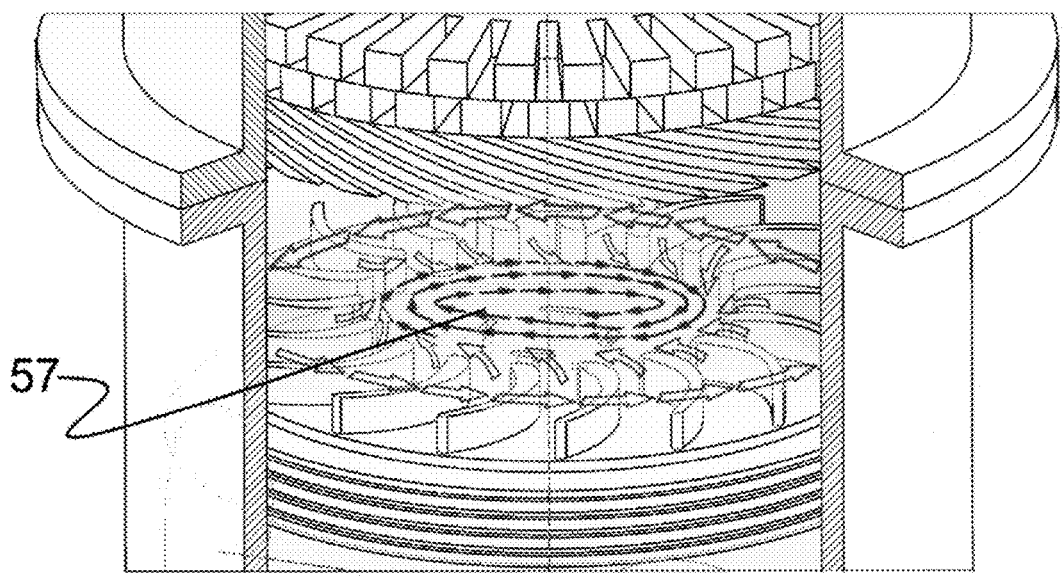
FIG. 22 is a Counter swirl energy center (CSEC) with arrows at the energy center showing the direction of HICS being opposite to the circumferential swirl for the engine of FIG. 1.

FIG. 20 shows the exhaust stroke, where the exhaust valve opens (59) and the products of combustion are expelled out of the cylinder (30). Certain amount of hot gases remains in the cylinder which possesses leftover energy. This leftover energy is useful for the subsequent cycles, so that less quantity of fuel can be supplied to maintain energy level of the energy center.

FIG. 18 shows the Direct swirl energy center (DSEC), where the direction of HICS is same as that of circumferential swirl. This is the simple energy center where molecules involve in side-collision. This energy center can be employed in engines using high octane fuels.

FIG. 19 shows the Counter swirl energy center (CSEC), where the direction of HICS (57) is opposite to that of circumferential swirl (56). The impeller blades have negative swirl angle in order to generate counter swirl. The impeller (20) should possess more kinetic energy in order to deflect the air stream in the opposite direction to cause HICS (57). Fuel molecules involve in head on collision when they enter into the energy center with high collision velocity. This enables strongly bonded atoms to rip off their molecules or even electrons to rip off from their atoms. This kind of energy center can be used to burn low octane fuels.

Figure 23:
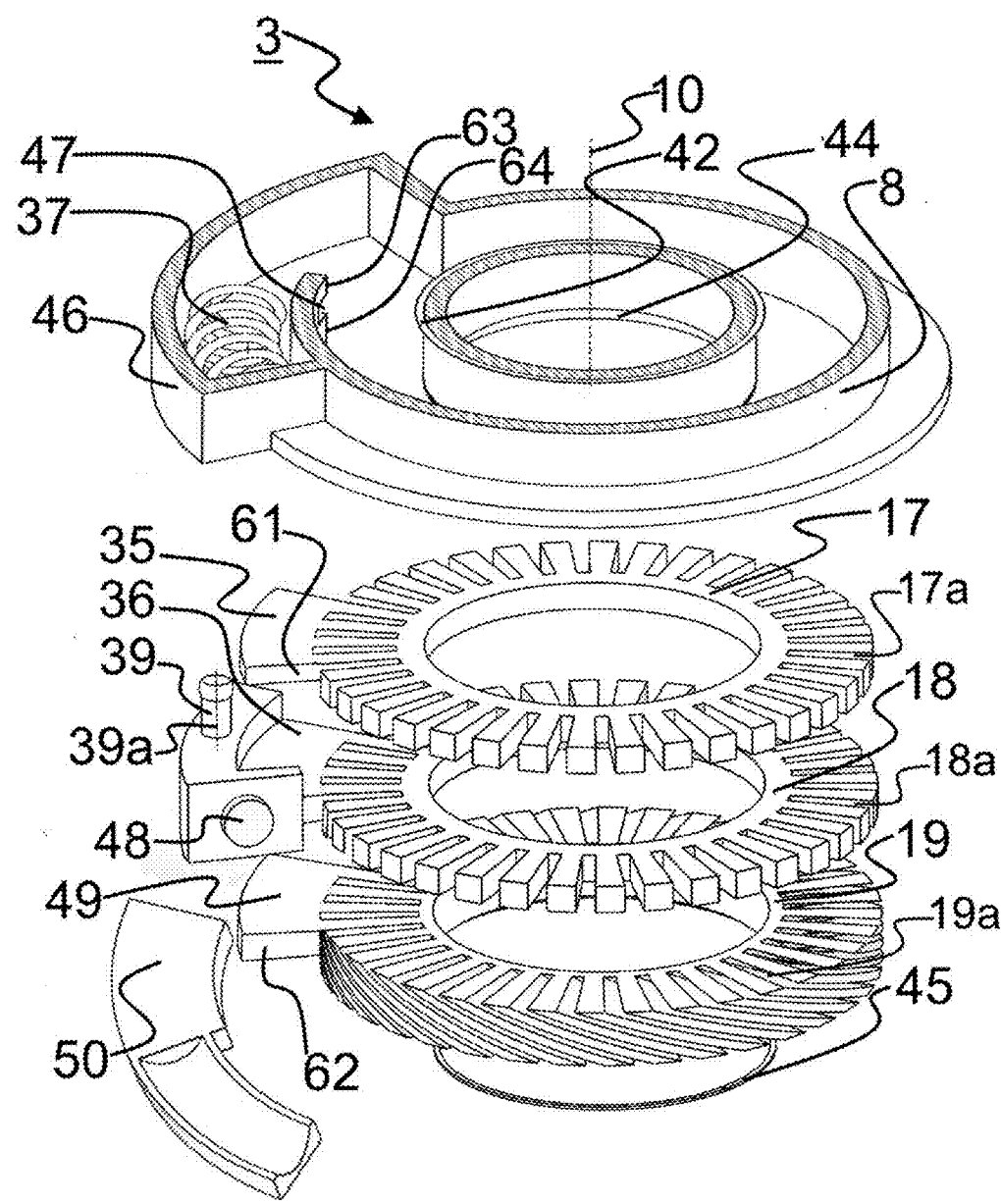
FIG. 23 is an exploded view of the Sunflower valve mechanism without Sunflower valve guide locks and Sunflower valve lock.

FIG. 23 is an exploded view of another Sunflower valve mechanism without Sunflower valve guide locks and a Sunflower valve lock. As will be appreciated by those of ordinary skill in the pertinent art, the Sunflower valve mechanism of FIG. 23 utilizes similar principles to the Sunflower valve mechanism of FIGS. 1-22 described above. Accordingly, like reference numerals are used to indicate like elements. The primary difference of the Sunflower valve mechanism of FIG. 23 is the Sunflower valve upper guide lock (35), the Sunflower valve lock (36), and Sunflower valve lower guide lock (49) being integral with the respective toparts (17), (18), (19). As such, mating surfaces (61), (62) touch against surfaces (63), (64), respectively to prevent rotation of the locks (35), (49).

It can therefore be seen that the present subject technology provides a self-cooled engine which is cooled by intake air-fuel mixture and provides more efficient combustion than existing engines. For these reasons, the instant subject technology is believed to represent a significant advancement in the art which has substantial commercial merit.

The subject technology uses Gasoline fuel, however increasing compression ratio and sweep factor can allow for usage of diesel fuel. The subject technology includes a Sunflower valve lower guide which has plurality of helical shaped, radial channels which are concentric with the cylinder axis. The channels are closed or opened by Sunflower valve mechanism. Sunflower valve mechanism achieves high degree of homogenous air-fuel mixture by streamlining the air movement using turbo-piston. During suction stroke, the Sunflower valve mechanism causes circumferential flow of air-fuel mixture into the cylinder which cools the cylinder and causes the fuel to atomize effectively. The incoming air stream rotates the impeller on the piston, which acts as a fan to cool the cylinder walls. During combustion, the impeller blades also deflect the flame from reaching the cylinder walls, and act as a thermal barrier between the energy center and the cylinder walls.

As can be seen, the engine of the present subject technology eliminates loss due to previously used cooling mechanisms, and significantly reduces incomplete combustion. In the engine of the present subject technology, fuel burns instantaneously at the center of the cylinder, and exerts force at the center of the piston. The cylinder is cooled by the fresh stream of incoming air, which eliminates the complicated cooling mechanisms currently used in internal combustion engines. High intensity compression swirl (HICS) created at the end of the compression stroke ensures that every molecule of the fuel involve in combustion. While there is shown and described herein certain specific structure embodying the subject technology, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An engine having a cylinder comprising:
    a cylinder head body comprising a Sunflower valve mechanism which includes a Sunflower valve having a plurality of channels disposed concentrically with an axis of the cylinder of the engine for permitting air-fuel mixture flow, wherein said Sunflower valve is secured to a cylindrical cam follower, said cylindrical cam follower to provide angular movement to said Sunflower valve,
    an exhaust valve mechanism comprising an exhaust valve cam, push rod and rocker arm to expel burnt gases out of the cylinder, and
    a reciprocating turbo-piston assembly movable through a stroke in the cylinder.

2. The engine according to claim 1, wherein:
    the cylinder head body has a cylindrical surface, and further comprises:
    an inlet manifold and an exhaust manifold disposed on the cylindrical surface of the cylinder head body;
    a valve lock housing on the cylindrical surface of the cylinder head body to accommodate a Sunflower valve upper guide lock, a Sunflower valve lock, a Sunflower valve lower guide lock, a Sunflower valve assembly cover and a cylindrical cam follower;
    a bracket providing bearing support for a camshaft and for a pushrod of an exhaust valve mechanism;
    an exhaust chamber having an outer cylindrical surface, wherein an annular protrusion is disposed on the outer cylindrical surface of the exhaust chamber to stop the Sunflower valve assembly movement along the cylinder axis;
    the exhaust chamber further having a recess below the said annular protrusion to receive a Sunflower assembly circlip disposed on the outer cylindrical surface of the exhaust chamber to stop the Sunflower valve assembly movement along the cylinder axis; and
    wherein the cylinder head body has threaded holes on the top surface of the cylinder head body to receive an injector and an igniter plug.

3. The engine according to claim 2, wherein:
    the Sunflower valve mechanism is disposed adjacent to the inlet manifold, and further comprises:
    a Sunflower valve upper guide having a plurality of channels disposed concentrically with an engine cylinder axis for guiding air-fuel mixture flow during a suction stroke of the engine, wherein said Sunflower valve upper guide is secured to the cylinder head body to prevent the rotation about the engine cylinder axis;
    a Sunflower valve lower guide having a plurality of helical shaped channels in line with said Sunflower valve upper guide disposed concentrically with the engine cylinder axis for guiding the air-fuel mixture to the cylinder to generate circumferential swirl, wherein said Sunflower valve lower guide is secured to the cylinder head body to prevent the rotation about the cylinder axis;
    the cylindrical cam follower being disposed on the top surface of the Sunflower valve lock to follow the cylindrical cam profile to impart angular movement to the Sunflower valve; an angular slot is formed on the valve lock housing of the cylinder head body to guide the cylindrical cam follower in an angular path; and
    a helical spring disposed on Sunflower valve spring seats to keep the Sunflower valve in a closed position.

4. The engine according to claim 1, further comprising:
    an exhaust valve cam and a cylindrical cam disposed on a cylindrical surface of a camshaft;
    the exhaust valve cam being mechanically coupled to a push rod for imparting reciprocating motion to the push rod; and
    a cylindrical cam follower which is mechanically coupled to a the cylindrical cam for imparting angular motion to the cylindrical cam follower and to the Sunflower valve mechanism.

5. The engine according to claim 1, wherein the turbo-piston assembly comprises:
    a piston having a top surface;
    an impeller rotatably disposed on the top surface of the piston, said impeller rotated by the force of intake air-fuel mixture about the cylinder axis, wherein the impeller is secured to said piston to prevent movement along the cylinder axis; and
    a connecting rod to convert reciprocating motion to rotary motion.

6. The engine according to claim 3, wherein:
    the Sunflower valve is rotatable about cylinder axis between Sunflower valve upper guide and Sunflower valve lower guide, and said Sunflower valve uncovers the channels of the Sunflower valve upper guide and the Sunflower valve lower guide to permit the air-fuel mixture flow into the cylinder during suction stroke; and
    the Sunflower valve mechanism includes helical channels of a Sunflower valve lower guide, which direct the air-fuel mixture flow into the cylinder circumferentially to generate circumferential swirl within the cylinder;
    the circumferential swirl generated by the said Sunflower valve mechanism, cools the walls of the engine cylinder; and
    the circumferential swirl generated by the said Sunflower valve mechanism, prevents flame propagation to the walls of the engine cylinder during a power stroke of the engine.

7. The engine according to claim 5, wherein:
the turbo-piston assembly moves upward during a compression stroke of the engine, to cause a high intensity compression swirl at an energy center of the engine cylinder, and
wherein the said high intensity compression swirl causes the air-fuel mixture to burn completely at the energy center.

\* \* \* \* \*